United States Patent [19]
Gammie et al.

[11] Patent Number: 5,237,610
[45] Date of Patent: * Aug. 17, 1993

[54] INDEPENDENT EXTERNAL SECURITY MODULE FOR A DIGITALLY UPGRADEABLE TELEVISION SIGNAL DECODER

[75] Inventors: Keith Gammie, Markham; Robert K. Yoneda, Toronto; Arthur Woo, Scarborough; Wayne Sheldrick, Don Mills, all of Canada

[73] Assignee: Scientific-Atlanta, Inc., Atlanta, Ga.

[ * ] Notice: The portion of the term of this patent subsequent to Jul. 2, 2008 has been disclaimed.

[21] Appl. No.: 677,460

[22] Filed: Mar. 29, 1991

Related U.S. Application Data

[63] Continuation-in-part of Ser. No. 473,442, Feb. 1, 1990, Pat. No. 5,029,207.

[51] Int. Cl.⁵ ............................................. H04N 7/167
[52] U.S. Cl. ....................................... 380/10; 380/16; 380/21; 380/23
[58] Field of Search ................... 380/10, 16, 21, 43, 380/23, 45

[56] References Cited

U.S. PATENT DOCUMENTS

Re. 33,189  3/1990  Lee et al.
2,656,408  10/1953  Gray et al. ............................ 380/11
4,281,216  7/1981  Hogg et al.

(List continued on next page.)

FOREIGN PATENT DOCUMENTS 0308219  6/1983  European Pat. Off.
0132401  1/1985  European Pat. Off.
0195523  3/1985  European Pat. Off.

(List continued on next page.)

OTHER PUBLICATIONS

A Method of Authentication In EFT Networks Using DES Without Downline Loading of Working Keys, by Marvin Sendrow, CH1529-7/80/0000-0168, reprint from Trends and Applications, May 1980.
United States Advanced Television Systems Committee (List continued on next page.)

*Primary Examiner*—David Cain
*Attorney, Agent, or Firm*—Banner, Birch, McKie & Beckett

[57] ABSTRACT

A decoder for descrambling encoded satellite transmissions comprises an internal security module and a resplaceable security module. The program signal is scrambled with a key and then the key itself is twice-encrypted and multiplexed with the scrambled program signal. The key is first encrypted with a first secret serial number ($SSN_1$) which is assigned to a given replaceable security module. The key is then encrypted with a second secret serial number ($SSN_2$) which is assigned to a given decoder. The decoder performs a first key decryption using the second secret serial number ($SSN_2$) stored within the decoder. The partially decrypted key is then further decrypted by the replaceable security module using the first secret serial number ($SSN_1$) stored within the replaceable security module. The decoder then descrambles the program using the twice-decrypted key. The replaceable security module can be replaced, allowing the security system to be upgraded or changed following a system breach. Either security module may become the active security module to finally decrypt the seed, selectable by a signal transmitted from the encoder.

Also disclosed is a method for transmitting the encrypted keys and secret serial numbers to a plurality of broadcasters who may in turn multiplex this signal with their own program signals so that any given channel received by a subscriber contains the key and secret serial numbers. Additionally, the decoder may be upgradeable to accept both analog and digital video signals without significant redundant circuitry.

28 Claims, 12 Drawing Sheets

U.S. PATENT DOCUMENTS

| | | |
|---|---|---|
| 4,317,957 | 3/1982 | Sendrow . |
| 4,323,921 | 4/1982 | Guillou ................................ 320/18 |
| 4,337,483 | 6/1982 | Guillou . |
| 4,386,223 | 5/1983 | Smid et al. . |
| 4,386,266 | 5/1983 | Chesarek . |
| 4,388,643 | 6/1983 | Aminetzah . |
| 4,399,323 | 8/1983 | Henry . |
| 4,484,025 | 11/1984 | Ostermann et al. . |
| 4,484,027 | 11/1984 | Lee et al. . |
| 4,530,008 | 7/1985 | McVoy . |
| 4,531,020 | 7/1985 | Wechselberger . |
| 4,531,021 | 7/1985 | Bluestein et al. . |
| 4,535,355 | 8/1985 | Arn et al. ............................ 358/123 |
| 4,558,175 | 12/1985 | Genest . |
| 4,559,647 | 7/1986 | George et al. . |
| 4,595,950 | 6/1986 | Lofberg . |
| 4,608,456 | 8/1986 | Paik et al. . |
| 4,613,901 | 9/1986 | Gilhousen et al. . |
| 4,634,808 | 1/1987 | Moerder . |
| 4,658,292 | 4/1987 | Okamoto et al. . |
| 4,663,664 | 5/1987 | Ragan et al. ......................... 380/16 |
| 4,682,223 | 7/1987 | Ragan et al. . |
| 4,682,224 | 7/1987 | Ragan et al. . |
| 4,696,034 | 9/1987 | Wiedemer . |
| 4,709,266 | 11/1987 | Hanas et al. ......................... 380/20 |
| 4,712,238 | 12/1987 | Gilhousen et al. . |
| 4,751,732 | 6/1988 | Kamitake . |
| 4,785,166 | 11/1988 | Kushima . |
| 4,807,286 | 2/1989 | Wiedemer . |
| 4,829,569 | 5/1989 | Seth-Smith et al. . |
| 4,841,133 | 6/1989 | Gercekci et al. . |
| 4,866,770 | 9/1989 | Seth-Smith et al. . |
| 4,885,788 | 12/1989 | Takaragi . |
| 4,897,875 | 1/1990 | Pollard et al. . |
| 4,905,280 | 2/1990 | Wiedemer . |
| 4,907,273 | 3/1990 | Wiedemer . |
| 4,933,898 | 6/1990 | Gilberg et al. . |
| 4,980,834 | 12/1990 | Wiedemer . |
| 4,993,066 | 2/1991 | Jenkins . |
| 5,029,207 | 7/1991 | Gammie ............................... 380/10 |

FOREIGN PATENT DOCUMENTS

| | | |
|---|---|---|
| 0179612 | 10/1985 | European Pat. Off. . |
| 0343805A3 | 11/1989 | European Pat. Off. . |
| 0471373A2 | 9/1992 | European Pat. Off. . |
| WO85/00491 | 7/1984 | PCT Int'l Appl. . |
| WO85/00718 | 2/1985 | PCT Int'l Appl. . |
| WO86/06240 | 10/1986 | PCT Int'l Appl. . |
| WO91/11884 | 8/1991 | PCT Int'l Appl. . |
| 2231755A | 11/1990 | United Kingdom . |

OTHER PUBLICATIONS

Report T2/62, "Multiplexed Analog Component Television Broadcast System Parameter Specifications", published Apr. 18, 1987.

Smart Card Conditional Access Microcomputers Memories, (Motorola) ISO 7816-2 (1988).

"HDTV To Alter Cable Security Technology", Multichannel News, Sep. 25, 1989.

INDEPENDENT EXTERNAL SECURITY MODULE FOR A DIGITALLY UPGRADEABLE TELEVISION SIGNAL DECODER

CROSS-REFERENCE TO RELATED APPLICATION

This application is a continuation-in-part of applicant Keith Gammie's copending application Ser. No. 473,442, filed Feb. 1, 1990, now U.S. Pat. No. 5,029,207, issued on Jul. 2, 1991.

BACKGROUND OF THE INVENTION

1. Field of the Invention

The present invention relates generally to the field of scrambling and transmission systems and more specifically, to an external security module for a television signal decoder of a broadcast, satellite, or cable television transmission system. Additionally, the present invention is more specifically directed to a method of transmitting subscriber information to subscription television signal distributors and methods for converting a television signal decoder to accept digital television signals. The present invention has particular application for B-type Multiplexed Analog Component (B-MAC) satellite transmission, but may also be used for NTSC (National Television Standards Committee), PAL, SECAM, or proposed high definition television formats. In addition, the scrambling system of the present invention can be used in applications in related fields such as electronic banking networks, telephone switching systems, cellular telephone networks, computer networks, etc. The system has particular application to so-called "conditional-access" multichannel television systems, where the viewer may have access to several "basic" channels, one or more "premium" or extra-cost channels as well as "pay-per-view" or "impulse pay-per-view" programs.

2. Description of the Relevant Art

In a pay television system, a pay television service provider typically protects the signal from unauthorized subscribers and pirates through scrambling.

For the purposes of the following discussion and this invention, the term "subscriber" means one who is paying for the television service. The "subscriber" could thus be an individual consumer with a decoder in his own home, or could be a system operator such as a local cable TV operator, or a small network operator such as a Hotel/Motel operator with a central decoder for all televisions in the Hotel or Motel. In addition, the "subscriber" could be an industrial user, as described in U.S. Pat. No. 4,866,770 assigned to the same assignee as the present application and incorporated herein by reference.

For the purposes of this invention, a network is defined as a program source, (such as a pay television provider), an encoder, (sometimes called a "headend"), a transmission means (satellite, cable, radio wave, etc.) and a series of decoders used by the subscribers as described above. A system is defined as a program source, an encoder, a transmission means, and a single receiving decoder. The system model is used to describe how an individual decoder in a network interacts with the encoder.

The scrambling process is accomplished via a key which may itself be encrypted. Each subscriber wishing to receive the signal is provided with a decoder having an identification number which is unique to the decoder. The decoder may be individually authorized with a key to descramble the scrambled signal, provided appropriate payments are made for service. Authorization is accomplished by distributing descrambling algorithms which work in combination with the key (and other information) to paying subscribers, and by denying that information to non-subscribers and to all would-be pirates.

The key may be transmitted as a data signal embedded in the normal television transmission associated with the identification number of the decoder. In a typical television signal, there are so-called "vertical blanking intervals" (VBI) occurring in each field and "horizontal blanking intervals" (HBI) occurring in each line between the chrominance and luminance signals. Various other signals can be sent "in-band" in the vertical and horizontal blanking intervals including additional audio channels, data, and teletext messages. The key can be embedded in these "blanking intervals" as is well known in the art. Attention is drawn in U.S. Pat. No. 4,829,569 assigned to the same assignee as the present application and incorporated herein by reference, showing how such data can be embedded in a B-MAC signal. Alternatively, the key may be sent "out-of-band" over a separate data channel or even over a telephone line.

Maintaining security in a conditional-access television network depends on the following requirements:

(i) The signal scrambling techniques must be sufficiently complex to insure that direct encryptographic attack is not practical.

(ii) keys distributed to an authorized decoder cannot be read out and transferred to other decoders.

The first condition can be satisfied by practical scrambling algorithms now available suchas the DES (Data Encryption Standard) or related algorithms.

The second condition requires the physical security of certain devices within the television signal decoder and is much more difficult to satisfy. Such a device must prevent observation of both the key decryption process and the partially decrypted key signals.

FIG. 1 shows a prior art conditional-access system for satellite transmission. In encoder 101, the source program information 102 which comprises video signals, audio signals, and data is scrambled in program scrambler 103 using a key from key memory 104. The scrambling techniques used may be any such techniques which are well known in the art. The key can be a signal or code number used in the scrambling process which is also required to "unlock" or descramble the program in program descrambler 108 in decoder 106. In practice, one key can be used (single layer encryption) or more than one key (not shown). The key be usually changed with time (i.e.—monthly to discourage piracy. The scrambled programs and the key are transmitted through satellite link 105, and received by conditional-access decoder 106. Decoder 106 recovers the key from the received signal, stores it in key memory 107 and applies it to program descrambler 108 which descrambles the scrambled program received over satellite link 105, and outputs unscrambled program 109. The system is not totally secure, as the key is transmitted in the clear through the channel and is available for recovery by pirates.

To overcome this difficulty and referring to prior art FIG. 2, a method of protecting the key during distribution is introduced into the system of FIG. 1. Prior to transmission, the key used to scramble source program 202 in program scrambler 203 is recovered from key memory 204 and itself encrypted in key encryptor 210 using a secret serial number (SSN) from serial numbers data base 211 which contains a list of the secret serial numbersof all legitimate subscribers. These secret serial numbers may relate to the unique identification numbers mentioned above for each decoder of a network of such decoders. The source program has now been scrambled using the key, and the key itself has been encrypted using a secret serial number. Thus, the key is not subject to compromise or recovery during transmission in comparison with the system of FIG. 1. In order to descramble the program, the pirate must first obtain the secret serial number of a legitimate decoder, match it with the appropriately encrypted key, decrypt the key, and then descramble the program. The secret serial number is installed in decoder 206, for example, during manufacture in SSN memory 212 resident in decoder 206. The secret serial number is therefore unavailable to pirates provided that decoder 206 remains physically secure.

Each secret serial number is unique to an individual decoder or, at least, unique to a group of decoders in order to be reasonably secure. The encrypted key may therefore be transmitted to each decoder individually by cycling through a database 211, containing all the secret serial numbers of the network in encoder 201 and forming a separate key distribution message in an addressed data packet individually addressed to each authorized decoder in the network. An individual decoder recognizes when its encrypted key has been received by reading the key distribution message attached to the encrypted key. A typical address data packet is depicted in FIG. 9 and described more fully below.

In known B-MAC systems, the key is distributed in an addressed data packet individually addressed to a particular subscriber's decoder by means of its unique identification number. The addressed data packet is typically inserted in lines 4 through 8 of the vertical blanking interval. Each addressed data packet is typically addressed to one individual decoder. As there are sixty fields generated per second (30 frames of 2 interlaced fields each) in a B-MAC or NTSC television signal, at the rate of one addressed data packet per field, a possible sixty different decoders (or groups of decoders) can be addressed each second, or 3600 per minute, 215,000 per hour, and over 5 million per day. Since each decoder need only be addressed when the service level or encryption level changes, there are sufficient frames available to individually address each decoder even in large systems. The address rate of the decoders may be increased by transmitting more than one addressed data packet per field. Additional data packets may be inserted in the vertical blanking interval or in the horizontal blanking intervals of each frame. The total number of possible addressable decoders is a function of the number on data bits available for decoder addresses. The B-MAC format typically uses 28 bits for decoder addresses, allowing for over 268 million possible decoder addresses. Attention is drawn to the United State Advanced Television Systems Committee Report T2/62, "MULTIPLEXED ANALOG COMPONENT TELEVISION BROADCAST SYSTEM PARAMETER SPECIFICATIONS," incorporated herein by reference, which describes the data formation a B-MAC signal.

After receiving the addressed data packet, key decryptor 213 then decrypts the key using the secret serial number stored in SSN memory 212. If service to any decoder 206 in the network is to be terminated, the secret serial number for that decoder is simply deleted from SSN database 211, and decoder 206 is deauthorized at the beginning of the next key period.

In a decoder such as the one shown in FIG. 2, the pay television provider has to rely on the physical security of the decoder box itself to prevent a pirate from reading or modifying the secret series number and key memories in the decoder or observing the key decryption process. In order to provide the necessary physical security, decoder boxes can be equipped with tamper-proof seals, specially headed screws and fasteners, or other tamper resistant packaging to make physical compromise of the decoder difficult. The subscriber is aware that tampering with the decoder could alter the tamper-proof seals or damage the decoder and subsequent examination could lead to discovery.

There are several disadvantages of relying on the physical security of the decoder to maintain system security. First, the pay television provider has to maintain ownership and control over all of the decoders of the network and then rent or lease the decoders to subscribers. The pay television provider is thus responsible for maintenance of all decoders and must maintain an expensive parts inventory and maintenance staff. In addition, in order to initiate service, a serviceperson must make a personal visit to the subscriber's location to install the decoder. In a pay television satellite system, such installation and service calls could be quite costly for remote installations which could be located anywhere in the world. Further, the physical security of a decoder could be breached without fear of discovery if a pirate could obtain a decoder that had been stolen either during the distribution process or from an individual subscriber's home.

Hence, the system of FIG. 2 can be secure only under the followings conditions;
(i) It must be impossible to read or modify the SSN and key memories in the decoder.
(ii) It must be impossible to observe the key decryption process, or the links between the four elements (207, 208, 212, and 213) of the decoder.

One way to achieve both of these goals is by the use of a so-called "secure microprocessor".

Decryption Microprocessors

FIG. 3 shows a block diagram of a typical prior art microprocessor 320 with processor 321, program memory 322, memory address bus 328, memory data 326 and memory data bus 327. In such a device, input data 323 is processed according to a program stored in program memory 322, producing output data 324. Program memory 322 can be "read out" through memory data bus 327. That is, the memory can be stepped through by sequentially incrementing memory address 325 through memory address bus 325 into program memory 322. Output memory data 326 from memory data bus 327 will reveal the entire program contents of microprocessor 320, including any stored descrambling algorithm and secret serial number. With such data, a pirate can easily decrypt a key transmitted through satellite link 205 of FIG. 2.

FIG. 4 shows a block diagram of an ideal secure microprocessor 420 adapted for securing an algorithm and secret serial number according to one aspect of the present invention. The major difference between secure microprocessor 420 of FIG. 4 and microprocessor 320 of FIG. 3 is that both memory address bus 328 and memory data bus 327 are absent, so there is no way to step through program memory 422 for the purpose of reading or writing. Memory references are executed only by processor 421 according to its mask-programmed code which cannot be changed. All input data 423 is treated as data for processing, and all output data 424 is the result of processing input data 423. There is no mechanism for reading or modifying the contents of program memory 422 via the data inputs.

Modern devices are a close approximation to this ideal secure microprocessor. There is, however, one requirement which causes a variation from the ideal. Following manufacture, there must be a mechanism available to write into memory 422 the decoder specific secret serial number 430, as well as decryption algorithm 434. If this facility were available to a pirate, he could modify the secret serial number for the purpose of cloning. Therefore, this facility must be permanently disabled after the secret serial number has been entered.

A variety of techniques may be used to disable the facility for writing into the memory. Secure microprocessor 420 could be provided with on-chip fusible data links 431, a software lock, or similar means for enabling the secret serial number 430 and descrambling algorithms 434 to be loaded into memory 422 at manufacture. Then, for example, the fusible links shown in dashed lines are destroyed so that a pirate has no access to descrambling algorithms 434 or secret serial number 430 stored in program memory 422.

In an alternative embodiment, the microprocessor of FIG. 4 can be secured with an "E$^2$ bit." The "E$^2$ bit", a form of software lock, will cause the entire memory (typically EEPROM) to be erased if an attempt is made to read out the contents of the memory. The "E$^2$ bit" provides two advantages; first, the memory is secured from would-be pirates, and second, the memory erasure will indicate that tampering has occurred.

A pirate would have to have access to extensive micro-chip facilities and a significant budget to compromise such a secure microprocessor. The physical security of the processor would have to be breached, destroying the processor and contents. However, integrated circuit technology continuously improves, and unexpected developments could occur which might enable attacks to be made at the microscopic level which are more economic than those available today. Further, the worldwide market for pirate decoders for satellite transmissions would provide the economic incentive to the increasingly sophisticated pirate electronics industry to compromise such a unit.

Copying a single decoder comprising a microprocessor according to FIG. 4 could lead to decoder clones based on the single secret serial number in that single decoder. Discovery would result in the termination of that secret serial number, and thus termination of all of the clones. However, a pirate would also have the option of using the single compromised unit to recover the key. The pirate could then develop a decoder design which would accept the key as a direct input. These pirate units could then be illegally distributed to subscribers, who would pay the pirate for a monthly update of the key. The consequence of a security breach could become extremely damaging to the pay television provider.

Replaceable Security Module

Pay television providers are therefore at risk if security depends exclusively on the physical defenses of the secure microprocessor. FIG. 5 shows a device which attempts to overcome the disadvantages of the devices of FIGS. 1 and 2 by providing a security device in a replaceable security module 514. Replaceable security module 514 comprises key decryptor 513, secret serial number memory 512 and key memory 507. As in FIG. 2, encoder 501 scrambles source program 502 comprising video signals, audio signals and data in program scrambler 503 using a key from key memory 504. The key is encrypted in key encryptor 510 using a secret serial number (SSN) from secret serial number database 511 which contains a list of the secret serial numbers of all legitimate subscribers.

The same SSN is installed in secret serial number memory 512 in replaceable security module 514 which is removably attachable to decoder 506. Key decryptor 513 of replaceable security module 514 decrypts the key using the secret serial number stored in secret serial number memory 512. The decrypted key is then stored in key memory 507. Unlike FIG. 2, the entire replaceable security module is removably attached to decoder 506. Program descrambler 508 reads the decrypted key from key memory 507 in replaceable security module 514 and uses the key to descramble and output descrambled program 509. Removable security module 514 is designed to be replaced by the subscriber, preferably without any special tools and, thus, most conventionally may comprise a plug-in module.

The use of a plug-in external module gives the pay television provider the ability to upgrade the technology in the security device by swapping it out at very low cost. In the event of a security breach, a new replaceable security module containing the program scrambling algorithm and SSN could be mailed out to authorized subscribers. The authorized subscribers could then remove the old replaceable security module from their decoder and insert the new replaceable security module themselves. System security is thus recovered without the expense of replacing the entire decoder or the expense of sending a service person to replace the replaceable security modules in each decoder. In addition, it is not necessary for the pay television provider to own the decoder itself. The decoder can be a generic commercially available unit purchased by the subscriber, or even integrated into the television itself. To initiate service, the pay television provider need only mail the replaceable security module to the subscriber and no service call is necessary.

Although the replaceable security module has the advantages of providing a guarantee that network security is recoverable following a breach, it also has some disadvantages. All the security resides in replaceable security module 514, and decoder 506 itself is a generic unit. The key signal which is generated by replaceable security module 514 is observable at its transfer point to decoder 506. The key can, however, be changed sufficiently often to ensure that it has no value to a potential pirate.

The problem with this approach is that a given removable security module 514 will operate with any decoder 506, and that tampering with replaceable security module 514 does not involve damage to decoder 506. Consequently, if replaceable security module 514 were to be compromised, piracy would become widespread very rapidly.

Multiple Encryption Layers

Although the devices as described above show a single key to scramble the program signal (so-called "single layer encryption") any of the prior art devices could also be practiced using a multiple key ("two layer", "three layer", etc.) scrambling system. A multiple key encryption system with particular applications to a cable television environment is described in U.S. Pat. No. 4,890,319, to Seth-Smith, issued Dec. 26, 1989, incorporated herein by reference. FIG. 6 shows an example of a prior art two layer encryption encoder 601. Encoder 601 contains secret serial number database 611 which contains a list of secret serial numbers for all authorized subscribers, these serial numbers preferably being 56 bits in length. Key memory 604 stores the "Key of the Month" (KOM) which in this embodiment can be either an "even" key for even months (February, April, June, etc.) or an "odd" key for odd months (January, March, May, etc.). The key could also be different for each month of the year, or could be made even more unique, depending on the available data bits for such a key. In addition, the key could be changed more frequently or less frequently than the monthly basis shown here. These KOM's are preferably 56 bits in length.

Key encryptor 610 encrypts the key selected from key memory 604 and outputs a series of encrypted keys $E_{SSN}[KOM]$ each encrypted with a secret serial number from secret serial number database 611, to data multiplexor 635. Seed memory 636 contains a "seed" which is used for scrambling the audio and video signals. The "seed" can also be a data code or a signal similar to the key described above. Preferably, the seed changes every ¼ second. Seed encryptor 637 encrypts the seed with the key of the month and outputs the encrypted seed $E_{KOM}[SEED]$ to data multiplexor 635. Thus the key has been encrypted with the secret serial number, and the seed encrypted with the key. Neither the key nor the seed can be easily recovered during transmission.

In this embodiment, source program 602 comprises a Multiplexed Analog Video (MAC) signal 639 with the typical chrominance and luminance signals described previously, along the with multiplexed audio data 638 which may comprise several different audio and non-audio (data) signals. For example, there may be at least two channels of audio (stereo) and additional channels of teletext for the hearing impaired. In addition, there may be additional channels of audio related to the video signal such as foreign language translations, unrelated audio signals such as radio programs or data signals such as subscriber messages, computer data, etc. All of these signals are digitized and multiplexed together, as is well known in the art, and the resulting multiplexed analog components, data 638 is then ready to be scrambled.

The seed passes through pseudo-random bit sequencer (PRBS) 643 and then is added to multiplexed audio data 638 in adder 644. Together, pseudo-random bit sequencer (PRBS) 643 and adder 644 comprise a bit-by-bit encryptor 645 as is well known in the art. The resulting scrambled multiplexed audio data is then passed to data multiplexor 635 and is multiplexed with the encrypted seed and key.

MAC video signal 639 is scrambled in line translation scrambler 603 which scrambles the lines of the AMC signal using the "seed" from seed memory 636 for the scrambling algorithm. The resulting scrambled MAC signal is then sent to multiplexor 632 which multiplexes the scrambled MAC signal with the output from data multiplexor 635. The multiplexed data output of data multiplexer 635 is modulated into pulse amplitude modulation (PAM) format by P.A.M. modulator 645. The output B-MAC signal 646 contains MAC video signal 639 and multiplexed PAM audio data 638, both scrambled with the seed, along with the seen encrypted with the key of the month, and a series of keys of the month which have been encrypted with the secret serial numbers of the subscriber's decoders, all multiplexed together.

In order to descramble the B-MAC signal 646, a pirate must be able to decrypt one of the encrypted keys, and use that key to decrypt the seed. However, as in the single layer encryption device described in FIG. 2, the pirate only needs to compromise one of the decoders in order to obtain a secret serial number, and thus decrypt the key. With the key, a pirate can then decrypt the seed, and with the seed, descramble the program signal. Additional "layers" of encryption (i.e.—more seeds and keys) make pirating more cumbersome, as the pirate must decrypt more seeds and keys, however, once the first key has been decrypted, the subsequent keys and seeds can be decrypted as well. In the embodiment shown in FIG. 6, keys need be decrypted every month for the pirate to be able to descramble the program signal all year. The secret serial numbers, seed, and key, as used in FIG. 6, can be used effectively by the pay television provider to terminate a particular decoder by secret serial number and generally discourage piracy by amateurs. However, while this system has not yet been compromised, a determined pirate may compromise such a multi-layered encryption system with the aid of a compromised decoder, the heart of such piracy being the gaining of access to a secret serial number.

A particular problem involves the transmission of the encrypted seeds and/or encrypted KOM's with the encrypted program signal to individual subscribers who may have their own antenna, commonly a backyard reception dish. Referring to FIG. 11, prior systems used a central control 1181 to insert addressed data packets or other subscriber related information into the program signals to authorize those individual receivers who receive encrypted signals directly, not through a local distributor. Central control 1181 would transmit addressed data packets, via dedicated lines 1185, to uplink broadcaster 1183 (e.g., Home Box Office, Cinemax, etc.) who would in turn multiplex the addressed data packets with their program signals usually encrypted. The signals would be transmitted to satellite 1105 and then back to an individual receiver 1189 typically through backyard reception antenna 1187. If a individual desired to receive certain programs, they would place a call through phone line 1188 to central control 1181. Central control in turn would relay the individual's authorization request through dedicated lines 1185 to uplink broadcasters 1183. Uplink broadcasters then would multiplex the individual's new authorization code with their particular encrypted program signals. The signals would then relay through satellite transponder 1105 to the individual's antenna 1187 and into their decoder box where the new authorization request would permit them to decrypt the new program signals. Such a system is currently used by General Instrument's Video Cypher II ™ TM system. Importantly, due to the transmission limitations of dedicated lines 1185, typically telephone lines, a broadcaster could not rapidly address all subscribers.

An additional problem with the prior art involve the upgrading of current television decoders to accept digital television signals. Previously, local cable television distributors would have to replace all existing converting boxes in subscriber homes with new converter boxes which could accommodate digital television signals. This was costly because new decoder boxes would have to be distributed and the old boxes collected and often times destroyed. Alternatively, a local cable television distributor could distribute new decoder boxes which would only accept digital television signals. Thus, subscribers would have their original decoder box which would accept analog signals while the new box would accept digital signals. This too was costly as many circuits within the two boxes would be redundant, additional spliters would have to be added at a subscriber's home to provide for two coaxial inputs to the boxes, in addition to other annoyances previously mentioned.

In view of the deficiencies of the above prior art devices, it still remains a requirement in the art to provide a scrambling system for pay television systems which does not rely solely on the physical security of the decoder components to maintain system integrity.

SUMMARY OF THE INVENTION

Therefore, it is an object of the present invention to provide a decoder with a data interface for a removable security module.

It is a further object of the present invention to provide a replaceable security module capable of performing all the functions performed by the internal security module.

It is a further object of the present invention to provide a system of double-encrypting the key using two different secret serial numbers respectively assigned to a subscriber's decoder and removable security module.

It is a further object of the present invention to provide a relaceable security module for a television signal decoder where the replaceable security module will work with only one decoder and cannot be used with another decoder.

It is still a further object of the present invention to provide a decoder where external security modules may be replaced without any disruption in a subscriber's reception of authorization signals.

It is yet a further object of the present invention to provide a method of transmitting the same authorization signals on multiple channels, to individual subscription television receivers.

It is yet a further object of the present invention to provide a low cost method of easily converting a decoder box to accept both analog and digital television signals without redundant circuitry.

Many of the above-stated problems and related problems of the prior art encryption devices have been solved by the principles of the present invention which is able to twice-encrypt the key prior to transmission, first with a first secret serial number ($SSN_0$) of the subscriber's replaceable external security module, and again with a second secret serial number ($SSN_1$) of the subscriber's decoder. The double-encryption technique discourages copying the replaceable external security module, as each replaceable security module will work only with its mating decoder. The system also allows the replaceable security module to be replaced following a system breach, thus allowing for recovery of system security. Furthermore, the present invention allows for uninterrupted transmission of decrypted signals upon replacement of the external security module by providing three steps of decryption. First, incoming signals are decrypted using the second secret serial numbers of the subscriber's decoder, before a new replaceable external security module is inserted into the decoder. Second, a valid key of the month (KOM) is delivered to the internal security module where it is decrypted using an alternate secret serial number (SSN). The packet is then forwarded to the new external security module where it is further decrypted and the valid KOM is stored. Finally, decryption of incoming signals are then routed to the external security module which becomes the active security element.

The system comprises an encoder for encoding a signal, the encoder further comprising a signal scrambler and a first and second key encrypters. The signal scrambler scrambles the signal and outputs a scrambled signal and a key for descrambling the scrambled signal. The first key encryptor is coupled to the signal scrambler and performs a first encryption on the key using a first secret serial number and outputs a once-encrypted key. The second key encryptor is coupled to the first key encryptor and performs a further encryption on the once-encrypted key using a second secret serial number and outputs a twice-encrypted key.

The system further comprises a transmitter coupled to the signal scrambler and the second key encryptor for transmitting the scrambled signal and twice-encrypted key.

The system further comprises a routing manager/decoder coupled to the transmitter for receiving and descrambling the scrambled signal. The decoder comprises first and second key decryptors and a descrambler. In the twice encrypted mode, the first key decryptor is coupled to the transmitter and performs a first key decryption on the twice-encrypted key using the second secret serial number and outputs a partially decrypted key. The second key decryptor is coupled to the first key decryptor and perform a second key decryption on the partially decrypted key using the first secret signal number and outputs the decrypted key. The descrambler is coupled to the second key decryptor and the transmitter and descrambles the scrambled signal using the decrypted key and outputs the descrambled signal. The decoder may function without the use of a replaceable security module. In the event of a system breach or a service level change, a replaceable security module may then be inserted into the decoder to "upgrade" the decoder.

In another embodiment of the present invention, authorization signals are transmitted from a master uplink through satellite transponder into a loop-back uplink. At the loop-back uplink, program audio and video signals are combined with the authorization signals and sent back to the satellite transponder then to an individual subscription television signal receiver.

In a further embodiment of the present invention, an easily connectable module or "side-car" is described which permits a standard decoder box to accept both analog and digital television signals. This digital side-car is capable of upgrading existing converter boxes without the duplication of non-video components.

These and other objects and advantages of the invention, as well as the details of an illustrative embodiment, will be more fully understood from the following specification and drawings in which similar elements in different figures are assigned the same last two digits to their reference numeral (i.e., decoder 706 of FIG. 7 and decoder 806 of FIG. 8).

DETAILED DESCRIPTION OF THE PREFERRED EMBODIMENT

Figure 5:
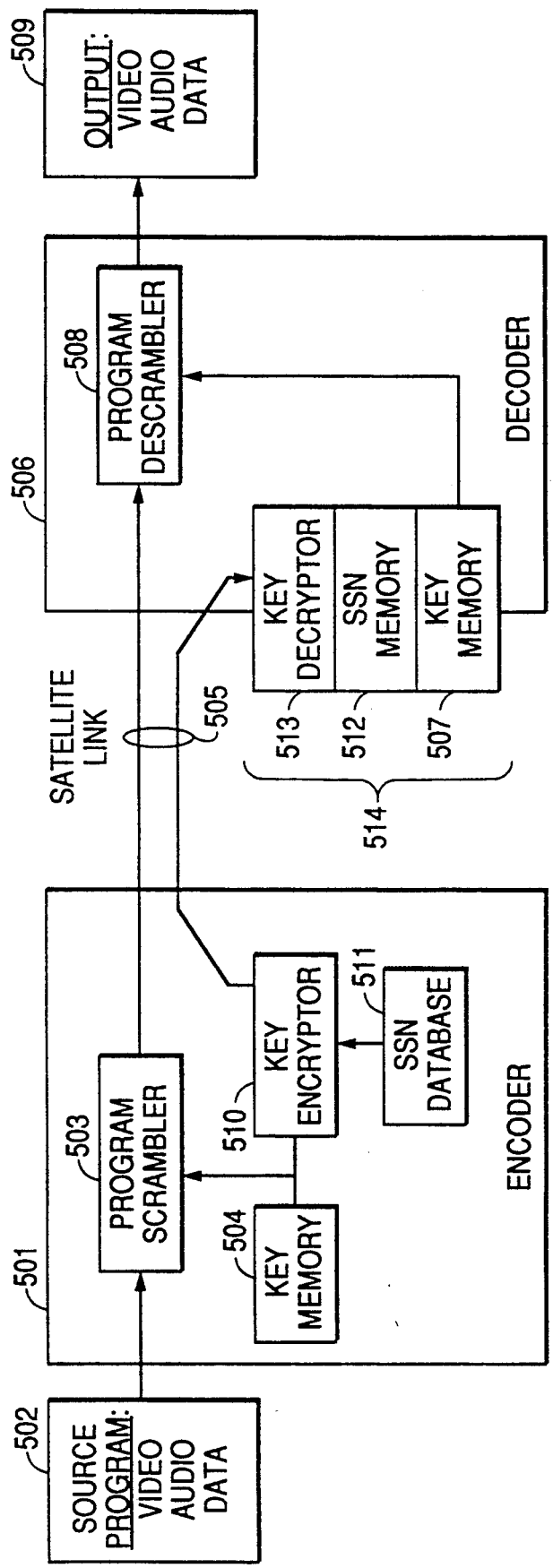
FIG. 5 shows an example of a conditional-access system for satellite transmission with a replaceable security module containing a first secret serial number.
Figure 7:
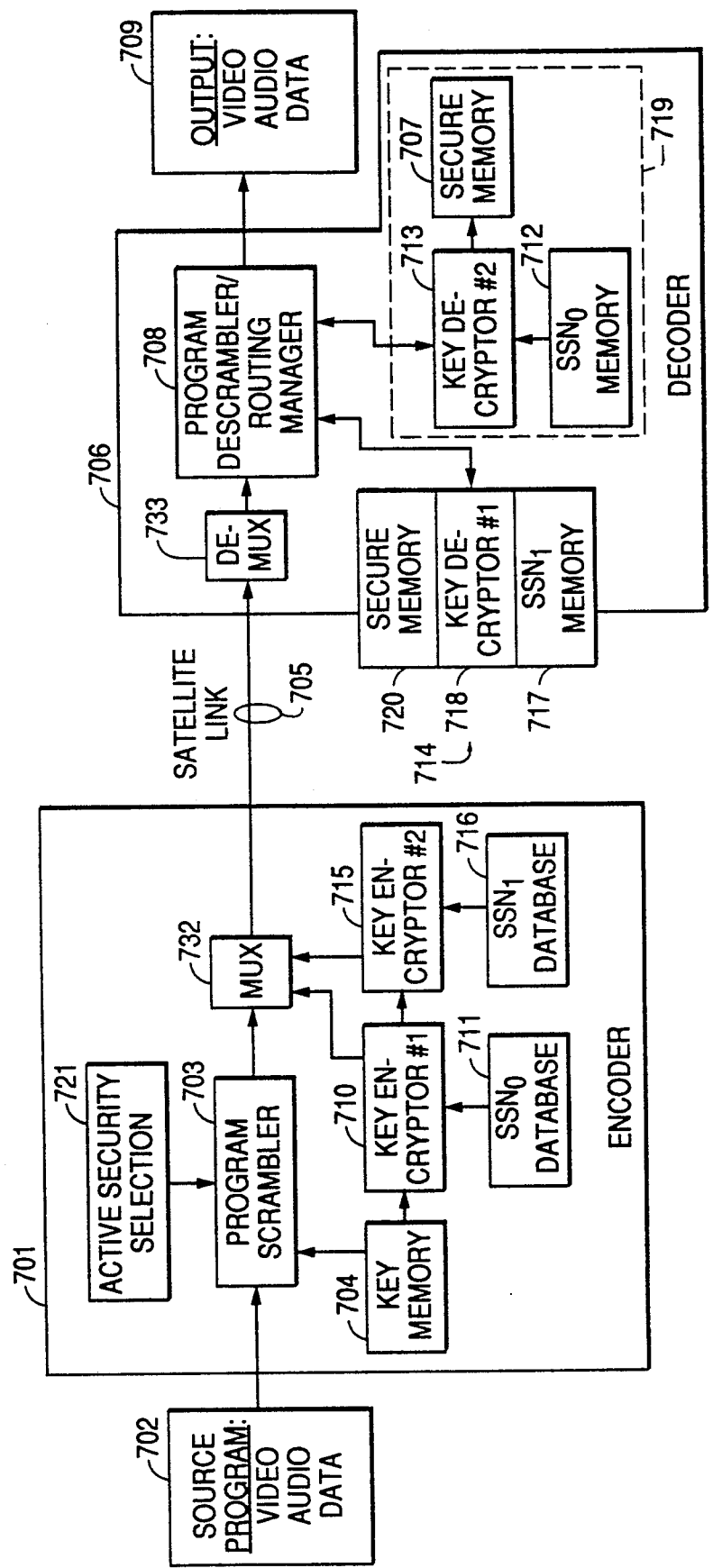
FIG. 7 shows one exemplary embodiment of the conditional-access system of the present invention with an encoder encrypting the key with both a first and second secret serial number, a satellite transmission system, and a decoder containing a first secret serial number and a replaceable security module containing a second secret serial number.

FIG. 7 shows the encryption system of the present invention comprising an encoder 701 for encoding a source program 702 for transmission over a satellite link 705 to at least one decoder 766. According to FIG. 7, the key is encrypted and addressed to individual decoders, similar to the device in FIG. 5. However, in this case, the key may be encrypted twice.

Encoder 701 has an active security selection memory 721 containing the active security selection. The active security selection selects the fixed security element 719 or the replaceable security element 714 as the active security element. Only the active security element with received B-MAC signals and supply the seed to the program scrambler 703.

Figure 6:
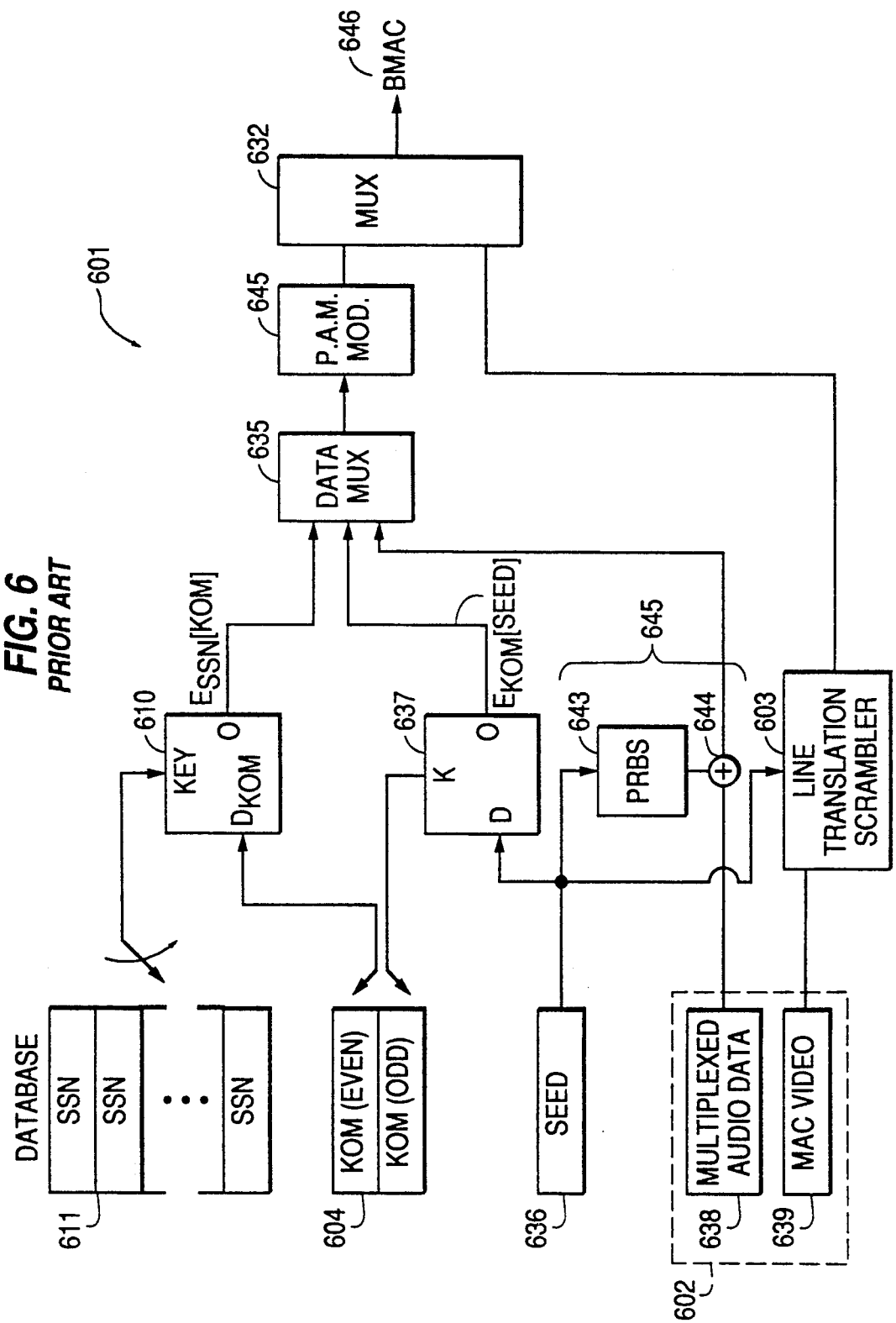
FIG. 6 shows another prior art conditional-access system for satellite transmission using an additional layer of encryption.

A key memory 704 contains the active security selection 721 and the seed used to scramble program 702 in program scrambler 703. Alternatively, as in FIG. 6, key memory 604 could contain keys of the month (KOMs) which are used to encrypt a seed. This seed is used to encrypt the source program 702. In this double encryption technique, the KOM is first encrypted in first key encryptor 710 with a first secret serial number ($SSN_0$) stored in $SSN_0$ database 711. The KOM is further encrypted in second key encryptor 715 with a second secret serial number ($SSN_1$) from $SSN_1$ database 716. This process continues for each SSN so as to produce a series of encrypted keys which are then multiplexed with the scrambled program via multiplexer 732 and transmitted via satellite link 705.

Decoder 706 receives and demultiplexes the encrypted program and encrypted keys via demultiplexer 733 and performs a first key decryption in internal security module 719 which is an integral part of the decoder 706. A second decryption takes place in a replaceable external security element 714 which is mounted on the exterior of the decoder 706, for example, as a plug-in module. Alternatively, the encrypted key could be sent separate from the encrypted program over two separate channels as described in copending application Ser. No. 473,442, incorporated herein by reference.

Figure 9:
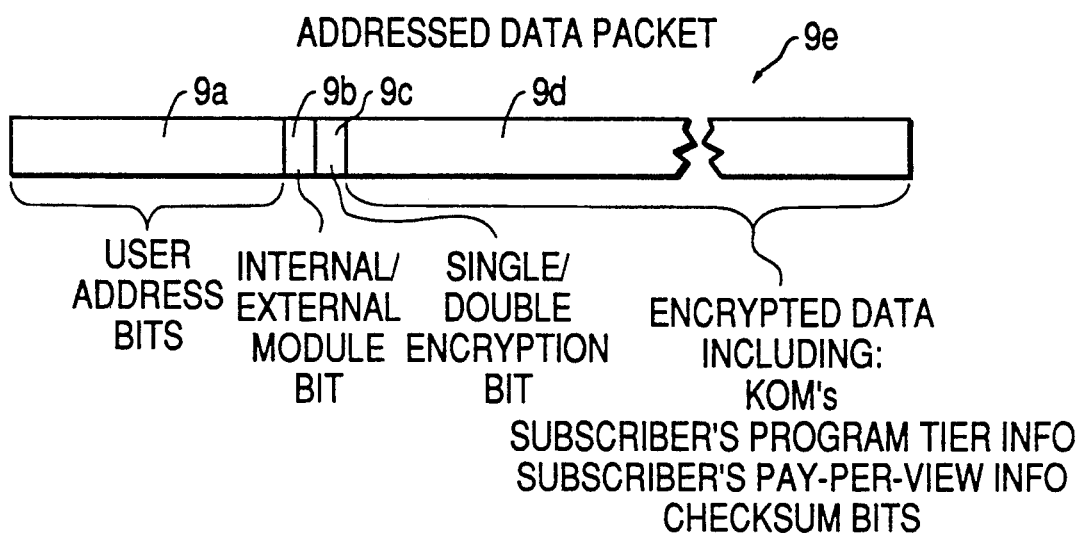
FIG. 9 shows a frame format for an addressed data packet.

Internal fixed security module 719 is the default security element when the replaceable external security module 714 is not installed. Internal security module 719 will receive system data routed from routing manager 708. The authorization and control data will preferably comprise or include addressed data packets as depicted in FIG. 9 and system data packets depicted in 9A. Addressed data packets 9e include preferably a 28 bit user identification number or address 9a which is sent unencrypted. This user address corresponds to a user address contained in both internal and external security modules 719 and 714. The routing manager 708 senses the unique used address of only internal security module 719 and correspondingly routes the entire addressed data packet 9e to the specified security module. Following the user address are two unencrypted bits 9b and 9c. The first bit 9b determines whether the addressed data packet is to be ultimately routed to the internal security module 719 or to the external security module 714. The second bit 9c determines whether the information which follows, encrypted information 9d, is encrypted either once or twice. If bit 9c indicates double encryption, then both the internal security module 719 and the external security module 714 are required to decrypt it. The bits of encrypted data 9d would include authorization and control data, e.g., the key of the month, subscriber authorization data such as user tier information, pay-per-view information, or other subscriber specific or decoder specific data. Generally, authorization data determines whether a particular subscriber or decoder is authorized to receive and decrypt a particular program or view pay-per-view programs, etc. Control data may include signals to determine whether data packets are routed, energy management data, burglar alarm data, or other decoder component enabling signals.

Table 1 shows how addressed data packets 9e are routed depending upon the value of bits 9b and 9c.

TABLE 1

| Destination Bit 9b | Encryption Bit 9c | Routing of Address Data Packet (ADP) Result |
|---|---|---|
| internal | single | ADP to internal security module only |
| internal | double | ADP to external module first, then to internal |
| external | single | ADP to external security module only |
| external | double | ADP to internal module first, then to external |

Figure 9A:
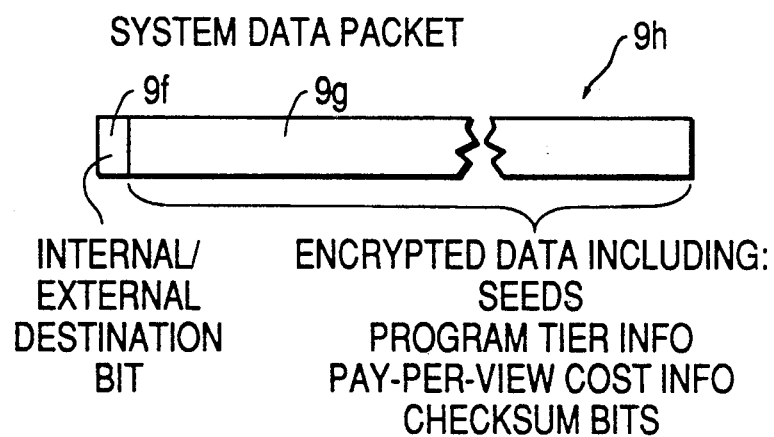
FIG. 9A shows a frame format for a system data packet.
Figure 11:
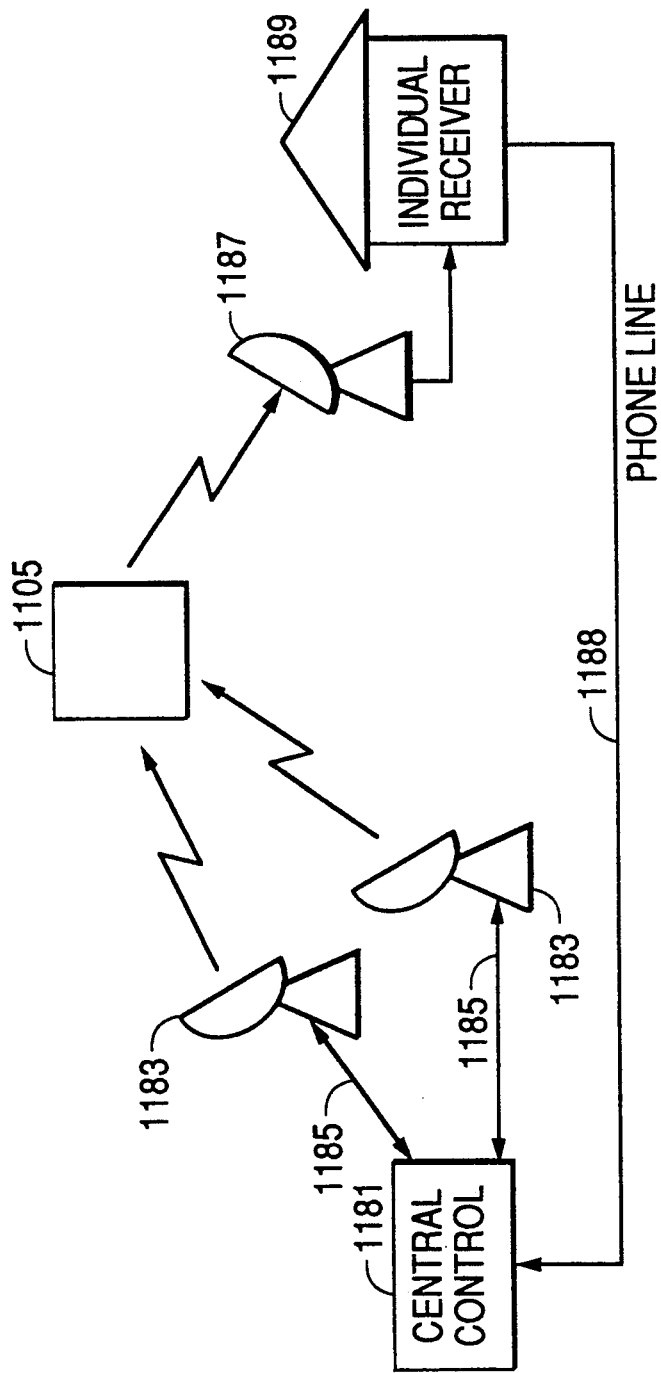
FIG. 11 shows a prior art system of transmitting authorization signals and addressed data packets between a central control and an individual television subscriber.

The system data packet shown in FIG. 9A contains program specific information and is sent and processed by all decoders. The system data packet 9h includes an internal/external destination bit 9f similar to bit 9b in address data packet 9e. Bit 9f determines where the system data packet is routed by routing manager 708, specifically, whether packet 9h is routed to the internal or the external security module. The information following, 9g, is encrypted data including the encryption seed, program tier information which determines in which tier the particular program is located, the cost of the program for pay-per-view purposes, checksum bits, and any additional information which is specific to the program or channel in which system data packet 9h is transmitted, Restating, system data packets 9h are specific to a particular program or channel, and are preferably inserted by program broadcasters (shown as 1183 in FIG. 11 and 1286 in FIG. 12). Each program is preferably encrypted with its unique seed.

As discussed earlier with reference to FIG. 6, the internal and external security modules must first receive and decrypt their unique addressed data packets to recover the key of the month. Using this key of the month then, the internal and external security modules would use this key of the month to decrypt the seed from system data packets 9h. Finally, the seed is sent from the security module through routing manager to video descrambler 873 or audio data decryptor 874 so as to decrypt a program video or audio.

All data contained in addressed data packet 9e and system data packet 9h may be processed by the internal security module 719. Similarly, the external security module 714 may replace the functionally of the internal security module 719 when it is installed. External security module 714 will be used as the active security element when directed by unencrypted data bit 9f of system data packet 9h. This allows external security module 714 to be deployed, inserted and authorized with addressed data packet information (particularly, KOM's) before the system switches the active security element from the internal security module 719 to the external security module 714. This process will be described more fully below. As previously mentioned, addressed data packets 9e contain user addressed 9a which is unencrypted and unique to each internal security module 719. The external security module 714 also has a unique user address which is used to track location of external modules. Once the external security module 714 is inserted, it may customize itself to the user address of the internal security module 719 by having the user address of internal security module 719 route its address to external security module 714 which may store this address in secure memory 720.

The addressed data packets 9e are used to deliver decoder specific information to a single decoder, preferably using the loop-back method described below with respect to FIG. 12. In a B-MAC television signal, the addressed data packets are preferably transmitted during the vertical blanking interval of each frame as discussed in the background of the invention. Each subscriber would have a unique address data packet corresponding to their decoder 706. Each decoder is assigned a single unique user address and a corresponding secret serial number (SSN). The user address and corresponding secret serial number are not identical, nor or they related. Preferably, the secret serial numbers are generated using a random number generator. When an address data packet with a corresponding user address is received, the packet can be decrypted thus revealing the KOM and data. All decrypted data (e.g., KOM's, tier data, PPV, etc.) is held within a secure memory within the module (707 or 720). The packets preferably contain a checksum which is used to verify both correct reception and decryption of the data. All addressed data packets are received by the routing manager 708, and, depending upon the value of bit 9b, sent to the indicated security module for decryption. The decrypted and stored data is used by the conditional access software or program authorization software contained within the security module to determine whether a particular program is to be decrypted depending upon a subscriber's tier, pay-per-view account, etc. Security modules 714 and 719 also determine whether a particular piece of encrypted data is to be placed within its secure memory module. For example, the call back telephone number used by modem 875 need not be stored in the secure memory, and thus, is passed to the modem.

Figure 1:
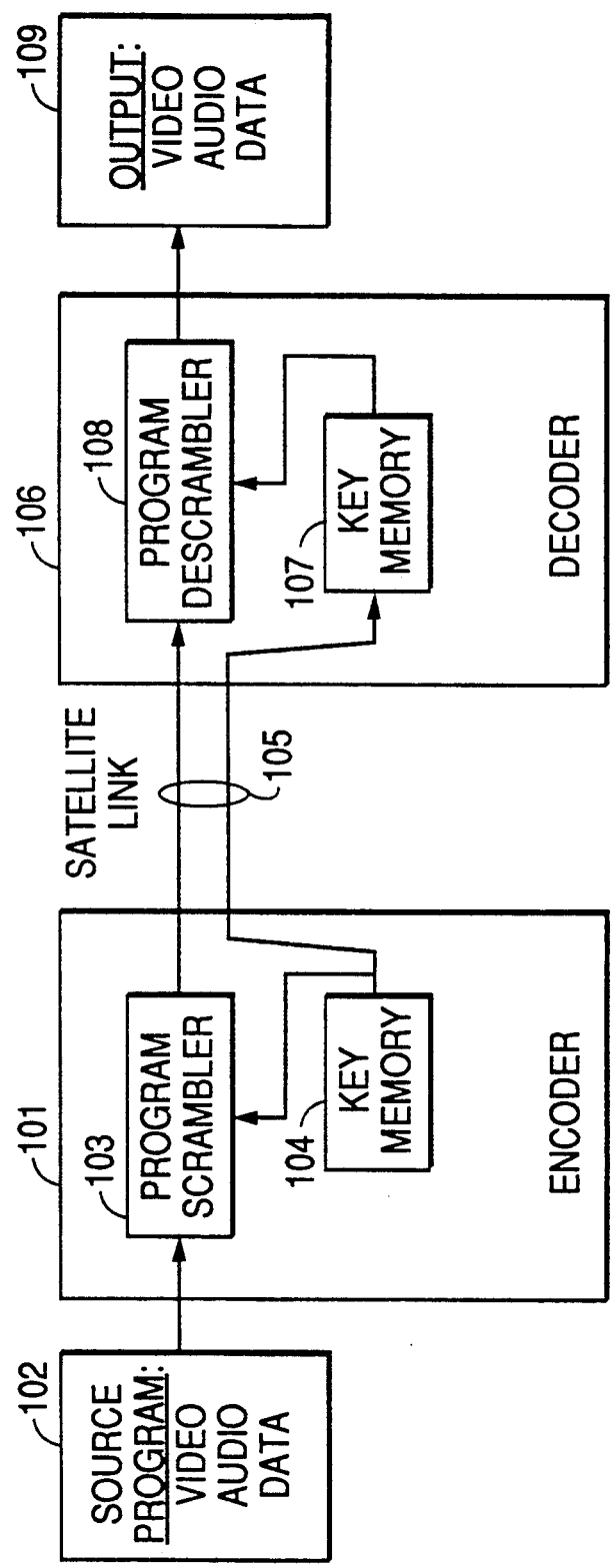
FIG. 1 shows an example of a prior art conditional-access system for satellite transmission with a key signal sent in the clear to the decoder.
Figure 2:
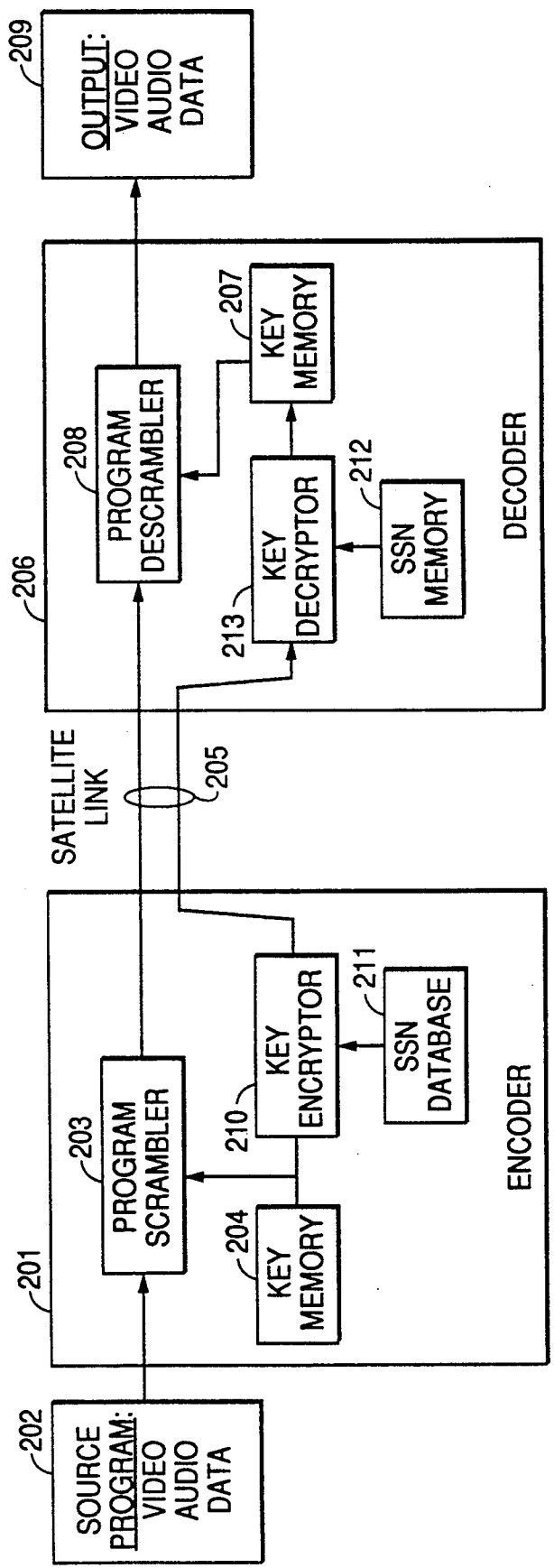
FIG. 2 shows an example of a prior art conditional-access system for satellite transmission using a single key encryption technique.
Figure 3:
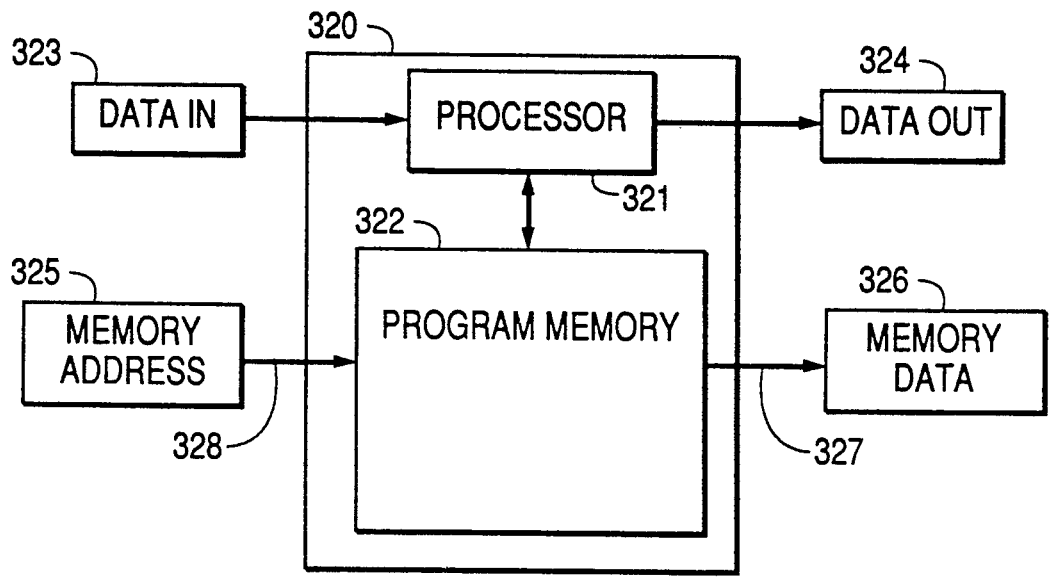
FIG. 3 shows an example of a prior art microprocessor without a secure memory.
Figure 4:
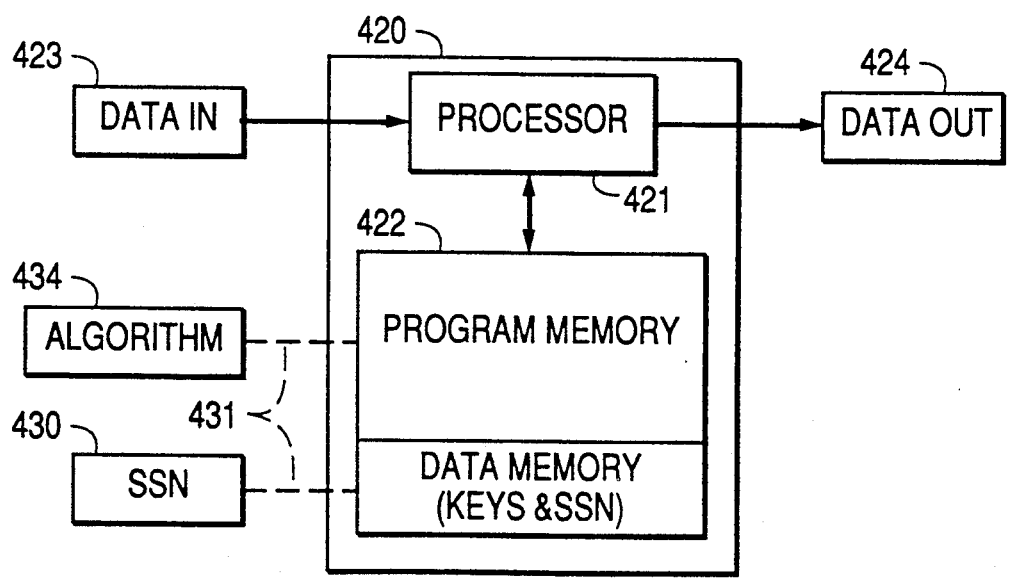
FIG. 4 shows a secure microprocessor with a secure memory and fusible data links adapted for storing an algorithm and secret serial number according to the present invention.

Both replaceable security module 714 and an internal security element 719 of decoder 706 may be constructed according to the principles of FIG. 4. For example, the second secret serial number $SSN_1$ may be loaded into $SSN_1$ memory 717 of module 714 via fusible links, and then these links destroyed during manufacture. Similarly, $SSN_0$ memory 712 of internal security element 719 may be loaded during manufacture over a fusible link and then the link destroyed. Also over a fusible link, algorithms may be loaded into key decryptors 718, 713 during manufacture and the fusible links subsequently destroyed.

The replaceable security module provides the pay television provider with the option of replacing system security by mailing out new replaceable security modules to all authorized subscribers. Returned replaceable security modules 714 could be re-used for a different decoder if the links were not destroyed by reprogramming the $SSN_0$ and $SSN_1$ databases 711 and 716 to correspond to the combination of the first secret serial number of decoder 706 with the second secret serial number of security module 714. Preferably, the returned replaceable security modules 714 are destroyed, and a new replaceable security module 714 sent to a subscriber, incorporating changes and improvements in the security technology to thwart potential pirates. In the event of a security breach, it is only necessary to replace the replaceable security module and not the complete decoder in order to restore system security. Most advantageously, the subscriber replaces the external security module without special assistance, and returns the old module to the service provider.

Figure 8:
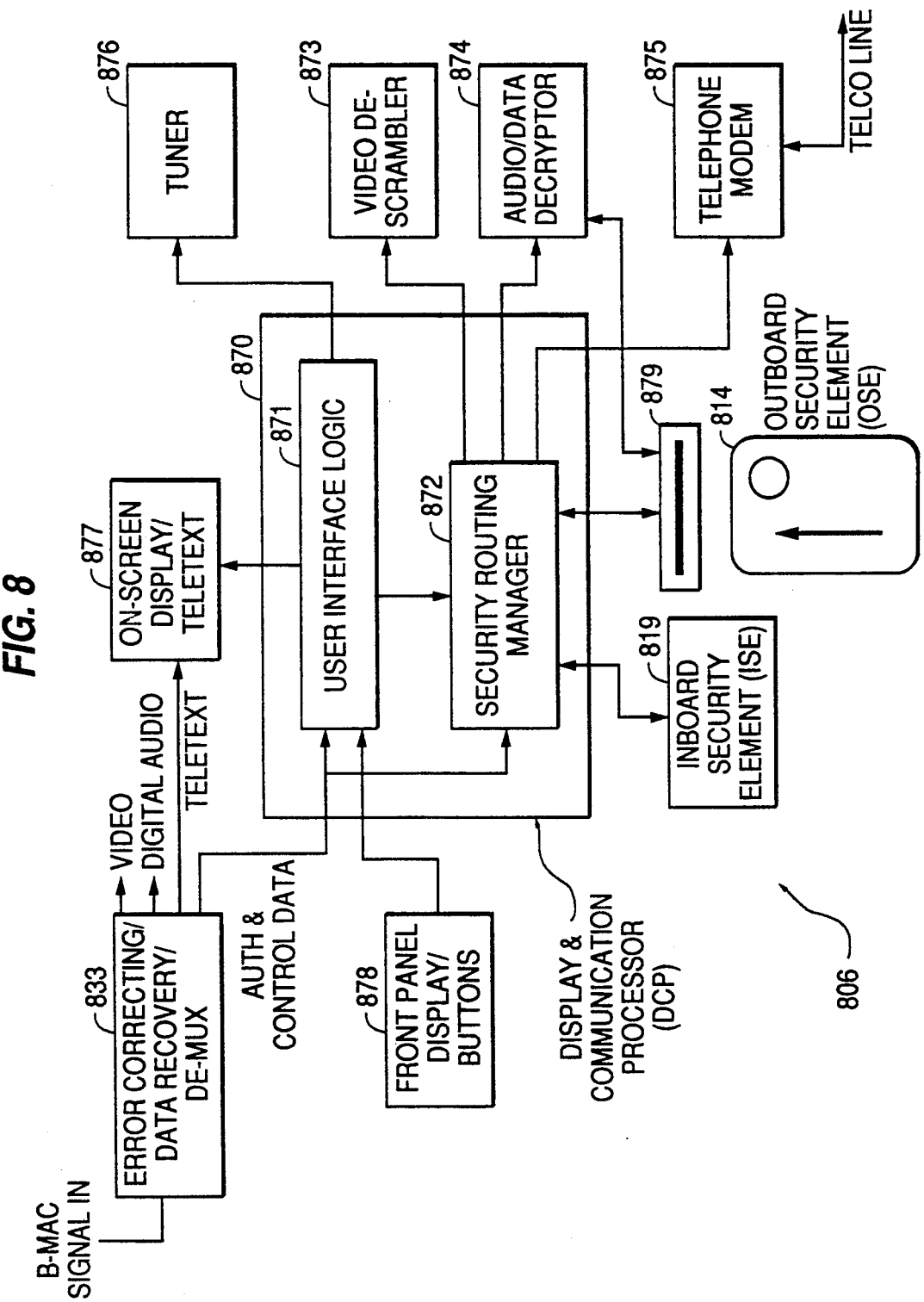
FIG. 8 shows an expanded view of the decoder of FIG. 7.

Referring to FIG. 8, an enlarged picture of encoder 706 is shown, particularly, program descrambler/routing manager 708 is more fully depicted. Incoming television signals, preferably B-MAC television signals, are input into demultiplexer 833. The demultiplexer separates video, digital audio, teletext, and authorization and control data. The authorization and control data, particularly addressed data packets 9e and system packets 9h, are input into display and communication processor 870. Demultiplexer 833 also provides error correcting and data recovery for the incoming signal. Furthermore, the incoming signal is formatted into a form which is more easily usable by the display and communications processor 870.

The authorization and control data, particularly addressed data packets 9e are input into the user interface logic 871 and the security routing manager 872 of the display and communication processor 870. Specifically, the incoming data rate is usually too fast for processor 870 to handle, therefore demultiplexer 833 stores and formats the data, and inputs it as a parallel stream into user interface logic 871 and security routing manager 872. If the addressed data packet 9e contains the unique user address 9a of this particular decoder 806 and the decryption bit 9c is set to single encryption, user interface logic 871 commands security routing manager 872 to pass the addressed data packet into internal security module (inboard security element or ISE) 819, if destination bit 9b is so set. Alternatively, if destination bit 9b is set for the external security module 814, security routing manager 872 forwards the address data packet through coupler 879 to the external security module (outboard security element or OSE) 814. See Table 1.

If encryption bit 9c is set for single encryption, then depending upon destination bit 9b, either the internal or external security module decrypts the encrypted address data packet information 9d. Once the KOM is decrypted, it is stored in secure memory 720 and 707, then used to decrypt the seed. This seed, preferably changing very frequently compared with the KOM, for example, every ¼ second, is then routed from either the internal or external security module through routing manager 872 to video descrambler 873 or audio/data decryptor 874. The seeds are used in video descrambler 873 and audio/data decryptor 874 to decrypt the video and audio data respectively. Since the seed changes so frequently, every ¼ second, it is not critical that the seed is sent unencrypted to video descrambler 873 and audio/data decryptor 874.

If encryption bit 9c is set for doubling encryption and destination bit 9b is set to external, then an incoming addressed data packet 9e is partially decrypted first in the internal security module using a first secret/confidential serial number, and then finally decrypted in the external security module using a second secret/confidential serial number. The KOM is once again stored in secure memory 720 and its used to decrypt the seed.

Coupler 879 is also connected to audio/data decryptor 874 to allow for the audio/data decryptor to be upgraded by an external security module 814 which could contain additional decrypting algorithms directed to audio data only. This would provide for increasing security of encrypted audio if current encryption of the audio had been compromised.

Telephone modem 875 may include a microprocessor to allow either the internal or external security modulus 819 and 814 to communicate to encoder 701 or other facilities via telephone lines. This feature will be discussed more fully below.

Also shown in FIG. 8 are front panel display 878 which includes input buttons for a subscriber and a display preferably on the front of decoder box 806. On screen displays/teletext 877 provides for on-screen messages or teletext to be either overlayed or displayed on a subscriber's television screen.

Transferring Security Functions Between Modules

The process of transferring the security functions from the internal security module to the external security module will be described now. Initially, all security functions are performed by internal security module 719. If a security breach occurs, it may be defended against by manufacturing and distributing external security modules with instructions for installation into decoder 706. At this point, the external security element does not have a valid key of the month in its secure memory 720 nor any appropriate tier and event numbers for the particular subscriber. Therefore, the external security element 714 cannot yet perform any independent security functions.

The KOM is delivered to the internal and external security modules using encrypted addressed data packets 9e. Because the external security element is installed to upgrade security, the addressed data packets for the internal security module and the external security module are encrypted differently using KOM's unique to each internal and each external security module. Therefore, the non-encrypted bit 9b determines the destination of the address data packet 9e, as shown in Table 1 above.

During this transition stage, addressed data packets carrying the next KOM are transmitted with destination bit 9b set to the external security module, with encryption bit 9c set to double encryption. The routing manager 708 still delivers the address data packet 9e to the internal security module first, but now the internal security module decrypts the address data packet 9d using an alternate secret serial number contained within its secret serial number memory 712. This alternate secret serial number is not the one which is normally used by the internal security module for decrypting addressed data packets 9d. The result of this decryption using the alternate secret serial number is passed back to the routing manager 872 and forwarded to the external security module 814 for final decryption using the secret serial number of the external security module. Thus, the key of the month is twice encrypted, first with the alternate secret serial number and second with the external security module's secret serial number. This twice encryption prevents casual migration of external security modules between decoders 706 since both decoder-specific decryptions must be successful. Restating, the KOM is twice encrypted during the transition stage with a secret serial number stored in the secure memory of the internal security module, and a secret serial number stored in the secure memory of the external security module for each internal and external security module in existence.

If the KOM was not twice encrypted with an alternate SSN, then a pirate could alter destination and encryption bits 9b and 9c to transmit a decrypted KOM between security modules, and thus intercept is during transmission. By using the alternate SSN, if tampering of destination and encryption bits occur, the internal security module would believe the encrypted KOM were encrypted using the regular SSN, and thus could not decrypt the KOM. Only partially decrypted KOM's are passed between modules and only in the double encryption state. The present system prohibits the use of exchanging external security modules between decoders since both SSNs must correspond with a twice encrypted KOM.

When the next KOM has been transmitted to and stored in all decoders 706, then the encoder 701 preferably changes the system data packet destination bit 9f to the external security module and encryption bit 9c to double encryption. The external security module 714 now becomes the active security element and assumes all security functions. Thus, the decrypting seeds are now decrypted with the KOM and released from the external security module 714 through security routing manager 872 to the video descrambler 873 and audio/data decryptor 874. Since the external security module now also contains the subscriber's authorization data such as program and service tiers, and pay-per-view event authorization in its secure non-volatile memory, it may conditionally release seeds to decrypt specific programs independent from the internal security module. Similarly, being an independent security module, the external security module may record impulse pay-per-view event purchases from the user interface logic 871 and upload this information to a phone manager via telephone modem 875 using encrypted communications as described below. Encryption bit 9c may be changed to single encryption if so desired. The reason for adding an external security module is to recover security after the internal security module had been comprised. Thus, in the preferred embodiment, double encryption is used and the external security module becomes the active security element upon compromise of the internal security module.

Once external security modules have been deployed, new security functions (including new secret serial numbers, encrypting algorithms, software or physical security) may be incorporated into the internal security module so that an external security module is not required in new decoder boxes which are distributed after external security modules have been destributed. Still, an empty coupler 879 is provided for future external security modules. To provide for compatible transmission to future external security modules, the internal security module in these new decoder boxes must functionally emulate the previous-generation internal security module, as well as perform the same function as the internal-external security module combination, and it must respond to both address data packet destination bit 9b and encryption bit 9c.

It a previously distributed external security module is compromised, a new external security module is deployed, with the subscriber removing the old and inserting the new. The new external security module will not have the key of the month, or the subscriber's authorization and control data such as tiers or event numbers. Therefore, to maintain continuity of service, all security and authorization functions are temporarily returned to the internal security module. Prior to distribution mailing of the new external security module. addressed data packets are transmitted with the destination bit 9b set to the internal security module and encryption bit 9c set to single encryption. Thereafter, the previously described steps are performed with encryption bit 9c changing to double encryption to allow the new KOM to be twice decrypted and stored in the new external security module. Finally, security, authorization and control functions are switched to the external security module with encryption bits set for either or double.

Summarizing, if a system breach occurs, the pay television provider then mails out replaceable external security modules to subscribers, switches decryption to the internal security module until all decoders have the new KOM, then uses decryption through the external security module only or uses the double encryption technique, and thus recovers system security. The optional usage of the replaceable external security module has other attractive benefits as well. Subscribers who do not pay for any premium channels may not be sent a replaceable security module, as the "basic" channels may only use a once-encrypted key or may even be sent in the clear. If the subscriber wishes to upgrade to a premium channel or channels, the pay television provider may then mail that subscriber the appropriate replaceable security module.

In addition, the replaceable security module may be used to add other additional features. Many cable television systems offer optional services such as IPPV (Impulse-Pay-Per-View) which require two-way communication between the decoder 706 and the headend. In the past, if a subscriber wished to upgrade to IPPV service, a subscriber's decoder would have to be altered by inserting a IPPV module internally or by adding an IPPV "side car" externally. Alternatively, the entire decoder would have to be replaced. All three options would necessitate a service call, causing inconvenience to the subscriber, and expense to the pay television provider. Similarly, when a pay television provider wishes to upgrade its entire encoder/decoder system, it must provide a new decoder to each subscriber which will work in the interim with both the old and new encoding techniques, as it is nearly impossible to replace all subscriber decoders simultaneously. Thus a decoder manufacturer is faced with the added expense of providing his state-of-the-art decoder with extra circuitry in order to function with the pay television provider's old encoder for the few months during the change over period.

In all of the above instances of upgrading existing service, the replaceable security module 714 may be used to upgrade the decoder 706 without the expense and inconvenience of a service call. The replaceable security module 714 may be mailed to the subscriber and the subscriber can then insert the replaceable security module 714 and instantly upgrade the decoder or add additional features (such as IPPV), alter the decoding technique, or provide an additional level of security. Preferably, IPPV is incorporated within the decoder 706. Notably, the replaceable security module 714 may add additional software features to the decoder.

The replaceable security module 714 may take one of several forms. In the preferred embodiment, the module may comprise a "smart card", a plastic "credit card" with a built-in microprocessor (such as a 68HC11 microprocessor), such as described by the International Standards Organization in standard ISO 7816/1 and ISO7816/2. Attention is drawn to U.S. Pat. No. 4,841,133 issued Jun. 20, 1989 and incorporated herein by reference, describing such a "smart card." the "smart card" may be equipped with a series of electrical contacts which connect to contacts in coupler 879. Preferably 16 contacts are provided so as to allow for plenty of expansion room if additional features are included in the future, since only 6 to 8 of the contacts would be used by the present invention. The contacts may provide power to the card, along with clock signals and data transmission. Additional contacts may be provided to allow connection between coupler 879 to audio/data decryptor 874. These additional contacts would allow for additional decrypting algorithms to be applied in conjunction with or independent from those decrypting algorithms contained in decryptor 874 or for some other purpose.

Use of Telephone Controller/Modem

Pay-per-view programming is defined here as any programming where the subscriber can request authorization to watch a particular program. In many pay television systems, pay-per-view programming is used for sporting events (boxing, wrestling, etc.) which are not transmitted on a regular basis. A subscriber wishing to view the event must receive authorization in the form of a special descrambler mechanism, or in the form of a special code transmitted or input to the subscriber's decoder. Some pay-per-view television systems allow the subscriber to request a pay-per-view program (i.e.,—movies) to watch. The pay television provider then transmits the requested program and authorizes that subscriber's decoder to receive the signal.

Impulse pay-per-view (IPPV) programming is defined here as any programming where the subscriber has a pre-authorized number of "credits" saved in his individual decoder. If a subscriber wishes to view a particular program, the subscriber merely actuates the decoder, the appropriate number of credits are subtracted from the subscriber's remaining credits, and the subscriber is immediately able to view the program. Pay television systems are disclosed, for example, in U.S. Pat. No. 4,484,217, issued Nov. 20, 1989 and 4,163,254 issued Jul. 31, 1979 to Block, incorporated herein by reference.

In a pay-per-view embodiment of the present invention, the decoder may send a signal to the headend via the telephone controller/modem 875 with a request for authorization to decode a pay-per-view program. Preferably however, secure memories 720 and 707 store authorization information (i.e.,-credits) for pay-per-view programming, and the security modules forward actual pay-per-view data via the telephone controller/modem 875 at a later time.

The telephone controller 940 could be a computer modem type device, or could work using touch-tone signals to communicate with the headend. Preferably, the telephone controller is a modem type device, communicating with the headend using a frequency shift keying or FSK protocol. Attention is drawn to U.S. Pat. No. 4,926,444, issued May 15, 1990, describing FSK operation and incorporated herein by reference. The pay television provider can thus send appropriate authorization information (TEL) to the subscriber, encrypted with a subscriber's secret telephone number (STN). The secret telephone number is not a telephone number in the ordinary sense, but rather another type of secret serial number, which could be assigned to a given telephone controller/modem 875 or series of telephone controllers. Once received by processor 870 of decoder 906, the authorization information may be routed and used to enable descrambling of a particular pay-per-view program or programs.

In another embodiment, which could be used in conjunction with the pay-per-view embodiment described above, the telephone controller/modem can be used to receive the KOM encrypted with the secret telephone number. The encrypted program signal is input to decoder 806 through modem 875 into processor 870. Modem 875 must be capable of providing the functions of demultiplexer 833 so as to separate the addressed data packets 9e, input them into processor 870 which will then route them to the prescribed security module.

The telephone controller 875 can be programmed to call the headend at a predetermined time or at a predetermined time interval, or upon receiving a signal from the headend preferably when phone usage is at a minimum (i.e.—early morning hours). The telephone controller can call the headend via a toll free 1-800 number, a so-called "watts" lie, or via a local call to a commercial data link such as TYMNET or TELENET. Once the call is connected and communications established, the decoder 806 uploads to the headend a record of pay-per-view usage encrypted with the secret telephone $STN_1$. The headend may then download data similarly encrypted to the decoder 806 including new keys, secret serial numbers, or decryption algorithms. The encrypted key or other encrypted data may be sent to either internal security element 819, or the replaceable security module 814. The information transmitted from the headend may come via the telephone line through modem 875 into processor 870 or preferably through the satellite TV input into box 833 and on into processor 879.

As discussed above, a new secret serial number or decryption algorithms, encrypted with the secret telephone number, may be sent from the headend to a decoder through telephone controller 875. The encrypted secret serial number or decryption algorithm is then decrypted and stored in the selected security modules. This downloading of decryption algorithms and secret serial numbers via the telephone controller 875 is sometimes called an "$E^2$ patch", and allows the pay television provider to maintain or recover system security by loading new information into a decoder's EEPROM. An $E^2$ patch does not necessarily entail changing the entire decryption algorithm in the decoder 806. The secret serial number or merely a portion of the decryption algorithm, such as a particular byte or data table need only be changed in order to sufficiently alter the decryption algorithm. The $E^2$ patch allows the pay television provider or upgrade the encryption system to fix "bugs" and recover system security.

After receiving a signal through the telephone controller 875, the headend will send an acknowledgment signal to the decoder, indicating that information has been received. Similarly, after data has been downloaded from the headed to the decoder through the telephone controller/modem, the decoder will return an acknowledgement signal through modem 875 to the headend that data has been received.

In addition to pay-per-view requests or records, telephone controller 875 can also be used to upload other signals from the decoder. For example, tamper protection information such as described in connection with FIG. 4 can be sent indicating whether or not the decoder has been tempered with. Further, program viewing information can be uploaded to the pay television provides for television rating purposes (i.e.,—Nielson ratings).

In general, any data that can be delivered via the B-MAC input of FIG. 9 (or NTSC, PAL, SECAM, etc.) can also be downloaded through the telephone controller 875. Such information includes, but is not limited to, blackout codes, tiering information, personal messages, number of available credits, group identification numbers, and other system data. Generally, the telephone controller 875 is used for infrequent communications, such as periodic security level changes and IPPV requests, due to the limited bandwidth of telephone lines and the increased cost of sending information via telephone versus the B-MAC input.

The telephone information (TEL) encrypted with the secret telephone number (STN) remains encrypted throughout the decoder 806 and may only be decrypted in the security modules. The decrypted telephone information does not pass out of the security modules, in order to prevent observation by a pirate. For decoder 806 to descramble a scrambled program, both the telephone information and the addressed data packet received through the B-MAC input must be present. By relying on both information sources, piracy is virtually impossible, as the potential pirate must break into the pay television provider's telephone system as well as decrypt a twice-encrypted key.

Figure 10:
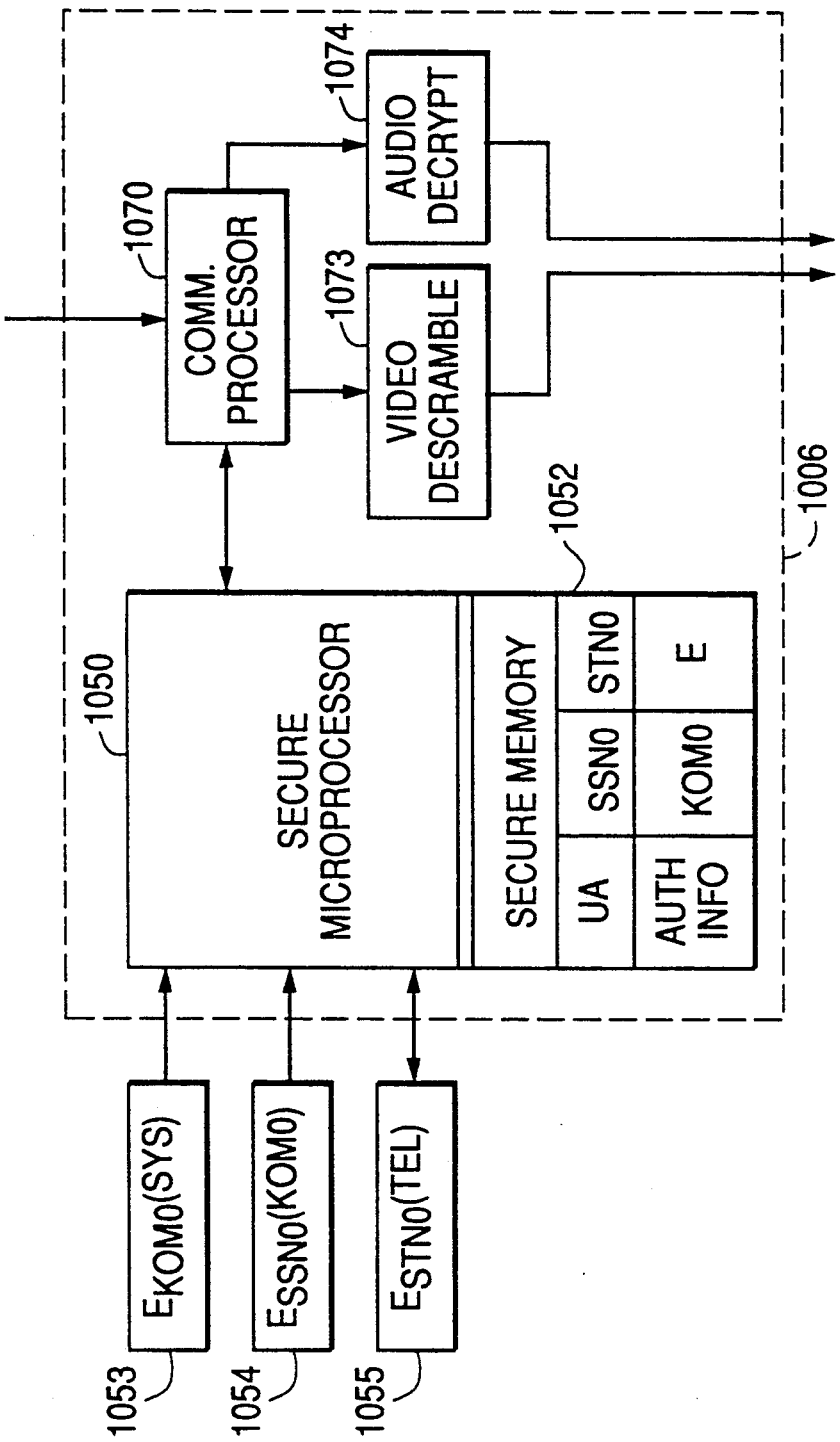
FIG. 10 shows communications between a secure microprocessor, either internal or external, and the routing manager.

FIG. 10 shows communications between a secure microprocessor, either internal or external, and the routing manager. Decoder 1006 comprises secure microprocessor 1050 with secure memory 1052. Secure memory 1052 contains a set of secret serial numbers $SSN_0$, a secret telephone number $STN_0$ unique to that decoder or a series of decoders loaded during manufacture and secured with an "$E^2$ bit" as discussed in connection with FIG. 4 or other security, the encryption algorithm E, and other authorization information. Encrypted program signal $E_{KOM0}(SYS)$ 1053 and once-encrypted key-of-the-month $E_{SSN0}(KOMO)$ 1054 are input to decoder 1006 along with optional encrypted telephone data $E_{STN0}(TEL)$ 1055.

Secure microprocessor 1050 decrypts encrypted telephone data $E_{STN0}(TEL)$ 1055 using the secret telephone number $STN_0$ stored in secure memory 1052. The decrypted telephone data (TEL) is also stored in secure memory 1052 to prevent observation by pirates. The telephone data (TEL) may provide authorization information to decoder 1006 as to whether decoder 1006 is presently authorized to decrypt some or all of the received encrypted programs. In addition, other information may be transferred between the decoder and the headend as discussed in connection with FIG. 9.

Transmission of Addressed Data Packets

Regarding the transmission of the encrypted signal with the addressed data packets 9e, previous systems incorporated a central control of the broadcasting uplink. As previously discussed and referring to FIG. 11, prior systems used a central control 1181 to insert addressed data packets or other subscriber related information into the program signals to authorize those individual receivers who receive encrypted signals directly, not through a local distributor. Central control 1181 would transmit addressed data packets, via dedicated lines 1185, to uplink broadcaster 1183 (e.g., Home Box Office, Cinemax, etc.) who would in turn multiplex the addressed data packets with their program signals, usually encrypted.

Figure 12:
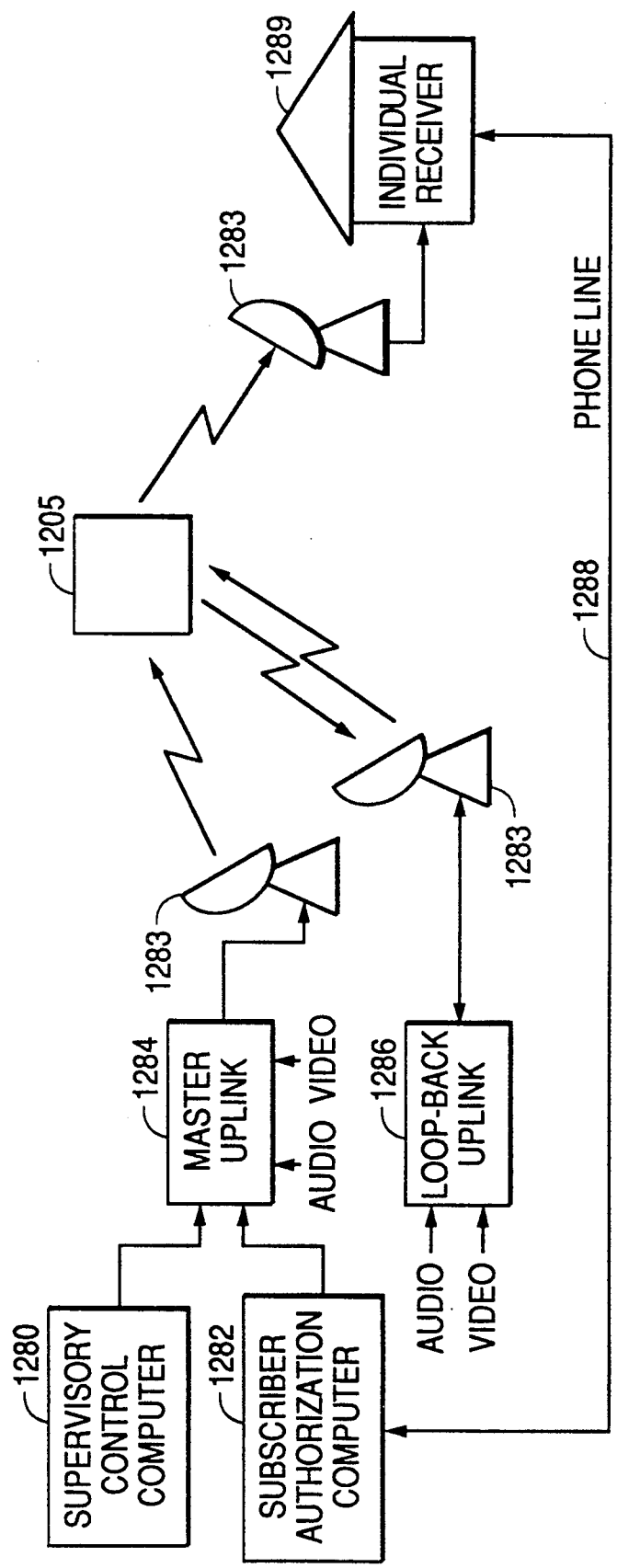
FIG. 12 shows another embodiment of the present invention for transmitting the same authorization signals on multiple channels from a central control to an individual television subscriber.

Under the new system and referring to FIG. 12, a subscriber authorization computer 1282 and supervisory control computer 1280 are provided which input the same subscriber and system data via addressed and system data packets 9e and 9h to master uplink 1284. The subscriber authorization computer 1282 and the supervisory control computer 1280 are both current products manufactured and sold by Scientific-Atlanta. Subscriber authorization computer 1282 contains all subscriber or decoder specific data in a large database. This subscriber specific data is then formatted into addressed data packets 9e for multiplexing with audio and video in master uplink 1284. Similarly, subscriber authorization computer 1282 contains system wide information specific to particular programs in a large database and is formatted into system data packets 9h for transmission. Master unlink 1284 multiplexes the system and addressed data packets with audio and video to produce a typical B-MAC signal. This signal may be received by any subscriber who may use the data packets to decrypt the program. The addressed and system data packets 9e and 9h are then transmitted on a channel with the audio and video to satellite transponder 1205 via satellite uplink 1283.

The signal is reflected from satellite transponder 1205 to satellite receiver and uplink 1283. The addressed and system data packets are received by loop-back uplink 1286 where they are stripped away from the audio and video program signals inserted at master uplink 1284. The packets are then multiplexed with different audio and video program signals and retransmitted to satellite transponder 1205. The combined signals are then transmitted to the individual receiver 1289 via receiver 1283 where they are decrypted. With this system, addressed data packets may be received by several loop-back uplink broadcasters who may multiplex these packets with their scrambled program signals. They may also take selected portions from the system data packet 9h, for example, tier information, pay-per-view cost data, etc. In this way, all loop-back uplink broadcasters preferably send broadcasted B-MAC program signals with data packets to all subscribers. A subscriber may tune to any channel to receive both the scrambled program and data packets to decrypt the program. The system wide data which may be combined at loop-back uplink 1286 preferably includes call-back data.

In this system, the need for dedicated lines 1185 to each broadcaster is obviated since the addressed data packets may be transmitted from master uplink 1284 to a variety of loop-back uplinks 1286 for the various program distributors (e.g., HBO, Cinemax, etc.). The addressed and system data packets are in the form depicted in FIGS. 9 and 9A respectively, and preferably placed in a B-MAC format. Thus, loop-back uplink 1286 must decode the B-MAC signals to remove the loop-back formatting so as to extract each individual encrypted address data packet 9e to be multiplexed with their particular encrypted program signal.

Additionally, the present invention may operate in a full field KOM mode which would be able to rapidly address all decoders 706 in the network. In a B-MAC television signal, the addressed data packets are preferably transmitted during the vertical blanking interval of each frame as discussed in the background of the invention. Typically, KOMs and addressed data packets are sent during five lines of the vertical blanking interval for each field. This produces roughly 6,000 bytes per second of data. This amount of data may be transmitted over dedicated lines 1185 of the prior art. However, if a broadcaster wanted to rapidly address all subscribers they were limited by the transmission capabilities of the dedicated lines 1185 typically telephone lines by a telephone company. Under the present invention, roughly 500 kilobytes per second of data may be sent in the full field mode. 204 video lines plus the 5 vertical blanking interval lines are available in this mode, per field, for transmitting addressed data packets. Consequently, if a broadcaster wanted to rapidly authorize PPV or IPPV viewing for a recently upcoming program (e.g., a boxing match), the broadcaster may do so with the present system. A text screen may appear on all subscriber's television sets which may indicate what was occurring.

With this system, an individual subscriber with a satellite receiving dish may receiver program signals and data packets from all satellites, regardless of which channel he is tuned. If he is authorized to decrypt a particular program signal, the signal will contain his unique address data packet which is routed by processor 870 and decrypted by the particular security module.

Digitally Upgrading the Decoder

Figure 13:
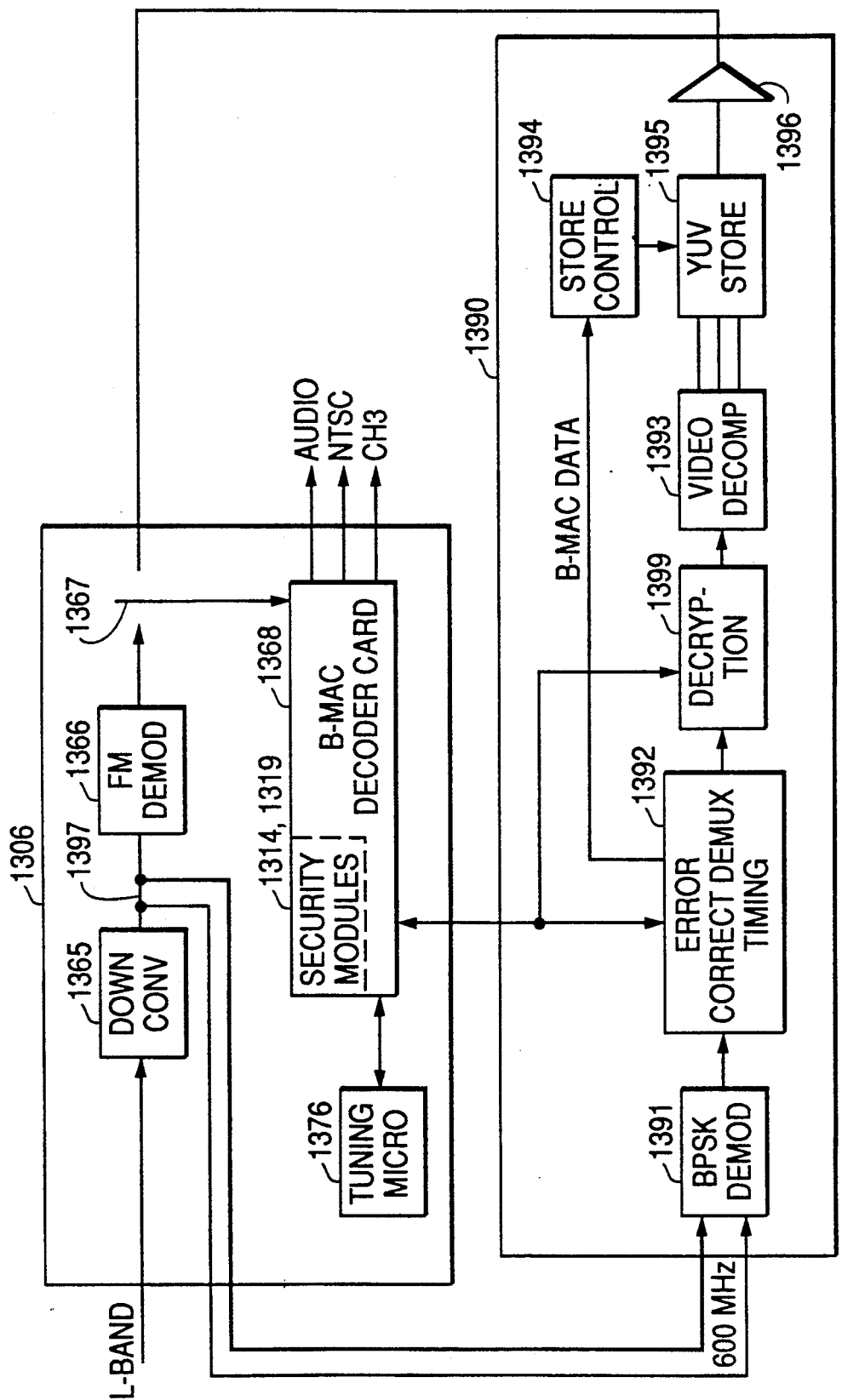
FIG. 13 shows another embodiment of the present invention where the decoder depicted in FIGS. 7 and 8 may be easily upgraded to accept both analog and digital television signals.

Referring to FIG. 13, a method of converting the analog decoder box depicted in FIG. 7 as 706 and FIG. 8 as 806 from an analog configuration to also accept digital television signals is shown. The original analog decoder box is depicted as 1306 where incoming signals are down converted in down converter 1365. Preferably incoming signals are in the L band region, having frequencies between 0.95 and 1.45 gigahertz, however, any other frequencies may be used. These frequencies are down converted to a fixed frequency more manageable by the decoder, preferably to a 612 megahertz intermediate frequency. The signals are then demodulated in FM demodulator 1366 and transmitted to decoder 1368 through switch 1367. Preferably, the signals are in a B-MAC form and therefore decoder 1368 decodes and decrypts the B-MAC signal to its audio, NTSC video and channel 3 signals to be input into a standard television receiver.

To upgrade the system to accept digital signals, a "digital side-car" 1390 may be added by using a simple four lead connection. Tap 1397 allows the down converted signals to be input into the quadrature phase shift key demodulator 1391 of side-car 1390. Preferably a 40 megabytes per second demodulator is used. The demodulated signals are then input into error correcting and demultiplexer 1392. Block 1392 also provides correct timing for the signals in side-car 1390.

Switch 1367 would be placed in a second position to receive digital signals whereby analog signals from digital to analog (D/A) converter 1396 are input into decoder card 1368. Tuning microprocessor 1367, coupled to decoder 1368 is used to control the physical transponder tuning function. Additionally, tuning microprocessor 1376 could also control volume, and display data on the front panel of decoder box 1390. Importantly, tuning microprocessor 1376 provides tuning information to box 1392 via decoder 1368 to allow demultiplexer 1392 to select a particular digital subchannel from all incoming signals contained within a particular channel. Specifically, the display and communication's processor 870 receives unencrypted channel location bits which allow it to locate and select a particular transponder number (or channel number) and sub-transponder (or subchannel number). Additionally, the video decryption seed from the security modules is also transmitted to box 1392 to allow the selected subchannel to be decrypted.

Box 1392 corrects error in the signal using a forward error correction method (FEC) with checksum or parity bits. The signal is demultiplexed with the selected subchannel input to video decompressor 1393. Typical digital video decompression would be discrete cosine transform (DCT) or other digital high compression technique known by those skilled in the art.

The decompressed/expanded digit video signals are then decrypted in decryptor 1399. If video signals are to be transmitted digitally, digital encryption using a key number rather than the previously described scrambling of analog signals using a seed is preferred. Consequently, external and internal security modules 1314 and 1319 respectively, of decoder 1368 provide decryption keys to decryptor 1399. Functioning of security modules 1314 and 1319 are identical to that previously described above.

The decrypted decompressed/expanded digital video signals are then processed for reformation to a B-MAC signal using techniques known by those skilled in the art. The expanded digital video signals are input into YUV store 1395 where the luminance signal Y is stored for each line or frame. Similarly, chrominance signals U and V are also stored on a frame basis. Box 1392 also inputs B-MAC data to store control 1394 which outputs the stored luminance and chrominance stores at correctly timed intervals through D/A converter 1396 to decoder 1368. Signals coming out of converter 1396 are typical B-MAC signals having video, audio and other data. From decoder 1368, the standard analog signals re then input into a television receiver.

This embodiment allows the digital side-car to decompress and expand the low bit rate signal into a full B-MAC video signal. The system data, system and addressed data packets 9e and 9h, teletext and digital audio are uncompressed and are passed out to decoder 1368 without decompression in side-car 1390.

Switch 1376 could be microprocessor controlled so that a "compression-enable" bit in the system data or address data packet is read and causes switch 1367 to enable the decompression digital side-car 1390 to be enabled. Thus, the decoder 1306 with digital side-car 1390 may be able to received and descramble both analog and digital video signals. Furthermore, tap 1397 is provided in FIG. 13 as a loop. This loop could be a single lead, however, the loop provides for additional flexibility of expansion.

While the present invention has been disclosed with respect to a preferred embodiment and modifications thereto, further modifications will be apparent to those of ordinary skill in the art within the scope of the claims that follow. It is not intended that the invention be limited by the disclosure, but instead that its scope be determined entirely by reference to the claims which follow.

What is claimed is:

1. A security system for transmission of a signal comprising:
encoder means for encoding said signal, said encoder means comprising:
signal scrambling means for scrambling said signal and outputting a scrambled signal and key for descrambling said scrambled signal,
first key encryptor means coupled to said signal scrambling means, for selectively performing a first encryption on said key using a first confidential serial number and outputting an encrypted key,
second key encryptor means coupled to said scrambling means for selectively performing a second encryption on said key using a second confidential serial number and outputting an encrypted key, and
decoder means coupled to said transmission means for receiving and descrambling said scrambled signal, said decoder means comprising:
first key decryptor means coupled to said transmission means, for performing a first key decryption on said encrypted key using said first confidential serial number if said key was encrypted with said first confidential serial number, a replaceable security module, removably attached to said decoder means and containing a second key decryptor means coupled to said transmission means, for performing a second key decryption on said encrypted key using a second confidential serial number if said encrypted key was encrypted with said second confidential serial number, and signal descrambling means coupled to said first and second key decryptor means, and said transmission means for descrambling said scrambled signal using said decrypted key.

2. The security system of claim 1, wherein said encoder means further comprises:

key memory means coupled tosaid signal scrambling means and said key encryptor means for storing said key.

3. The security system of claim 1, wherein said encoder means further comprises:

a first confidential serial number database coupled to said key encryptor means, containing a list of first confidential serial numbers, and a second confidential serial number database coupled to said key encryptor means, containing a list of second confidential serial numbers.

4. The security system of claim 1, wherein said decoder means further comprises:

first confidential serial number memory means coupled to said first key decryptor means, for storing a first confidential serial number.

5. The security system of claim 4, wherein said decoder means further comprises:

second confidential serial number memory means coupled to said second key decryptor means for storing a second confidential serial number.

6. The security system of claim 5, wherein said second confidential serial number is assigned tosaid replaceable security module.

7. The security system of claim 1, wherein said decoder means further comprises:

telephone interface means for transmitting and receiving data to and from a pay television provider.

8. The security system of claim 7, wherein a confidential serial number is received by said replaceable security module via said telephone interface means.

9. The security system of claim 7, wherein subscriber input data is transmitted by the replaceable security module via said telephone interface means.

10. The security system of claim 1, wherein said signal is a television signal.

11. The security system of claim 10, wherein said television signal is a B-MAC type television signal.

12. A decoder for receiving and descrambling a signal which has been scrambled using a key which has been selectively encrypted, said decoder comprising:

first key decryptor means coupled to said decoder, for performing a first keydecryption on said encrypted key using a first confidential serial number and outputting a decrypted key if said key was encrypted using said first confidential serial number, a replaceable security module, removably attached to said decoder and containing a second key decryptor means, for performing a second key decryption on said key using a second confidential serial number and outputting a decrypted key if said key was encrypted using said second confidential serial number, signal descrambling means coupled tosaid second key decryptor means for descrambling said scrambled signal using said decrypted key.

13. The decoder of claim 12, further comprising:

first and second key memory means coupled to said first and second key decryptor means respectively, for storing said decrypted key.

14. The decoder of claim 12, further comprising:

first and second confidential serial number memory means coupled to said first and second key decryptor means respectively, for storing first and second confidential serial numbers respectively.

15. The decoder of claim 12, wherein said signal is a television signal.

16. The decoder of claim 12 further comprising:

telephone interface means for transmitting and receiving data to and from a pay television provider, said data encrypted with a confidential telephone number.

17. The decoder of claim 16, wherein a confidential serial number is received by replaceable security module via said telephone interface means.

18. The decoder of claim 15, wherein said television signal is a B-MAC type television signal.

19. The relaceable security module of claim 13, wherein said first and second memory means further comprises:

security means for allowing the contents of said first and second memory means to be read only by said first and second key decryption means respectively.

20. The decoder of claim 12, further comprising:

means for receiving a plurality of compressed digital signals with a plurality of address, each address corresponding to a particular digital signal;

means for selecting a particular digital signal by identifying the particular address;

means coupled to the means for selecting, for correcting error in the selected digital signal;

means, coupled to the means for correcting, for decompressing the corrected digital signal; and means for removably coupling connected between the means for receiving and the means for selecting.

21. The apparatus of claim 20 wherein the coupling means comprises at most four connections.

22. A method of decoding a signal comprising the steps of:

receiving a scrambled signal and an encrypted key in a decoder, performing a first decryption of said encrypted key using a first confidential serial number to produce a decrypted key signal, if said key was encrypted with said first confidential serial number, performing a second decryption on said encrypted key in a replaceable security module removably attached to said decoder using a second confidential serial number to produce a decrypted key, if said key was encrypted with said second confidential serial number, and descrambling said scrambled signal using said decrypted key to produce a descrambled signal.

23. The method of claim 22, wherein said first confidential serial number is assigned to said decoder.

24. The method of claim 22, wherein said second confidential serial number is assigned to said replaceable security module.

25. The method of claim 22, further comprising the steps of:
providing subscriber information including said encrypted key and said first and second confidential serial numbers at a first source;
providing a plurality of program signals at a plurality of second sources;
transmitting the subscriber information to the second sources;
combining the subscriber information with the program signals to produce a combined signal; and,
transmitting the combined signal to said decoder.

26. An apparatus for converting an analog reception system to accept both analog and digital signals comprising:
means for receiving a plurality of compressed digital signals with a plurality of address, each address corresponding to a particular digital signal;
means for selecting a particular digital signal by identifying the particular address;
means, coupled to the means for selecting, for correcting error in the selected digital signal;
means, coupled to the means for correcting, for decompressing the corrected digital signal;
means coupled to said means for decompressing and said signal descrambling means, for descrambling said decompressed television signal; and,
means for removably coupling connected between the means for receiving and the means for selecting.

27. The apparatus of claim 26 further comprising means for decrypting said television signal coupled to said means for decompressing.

28. A method of communicating subscriber information to a broadcasters of program signals in a program environment comprises the steps of:
providing the subscriber information at a first source;
providing the plurality of program signals at a plurality of second sources;
transmitting the subscriber information to the second sources;
combining the subscriber information with the program signals to produce a combined signal; and,
broadcasting the combined signal to at least one subscriber.

* * * * *

UNITED STATES PATENT AND TRADEMARK OFFICE
CERTIFICATE OF CORRECTION

Page 1 of 2

PATENT NO. : 5,237,610
DATED : August 17, 1993
INVENTOR(S) : Keith Gammie et al.

It is certified that error appears in the above-identified patent and that said Letters Patent is hereby corrected as shown below:

In claim 1, column 24, line 58, after "key," insert --and--. Line 62, delete "and" (second occurrence).

In claim 3, column 25, line 23, after "said" insert --first--. Line 26, after "said" insert --second--.

In claim 4, column 25, line 31, delete "a" and insert --said--.

In claim 5, column 25, line 37, delete "a" and insert --said--.

In claim 12, column 25, line 61, after "a" insert --first--. Line 68, after "a" insert --second--. In column 26, line 5, after "said" insert --second--.

In claim 17, column 26, line 23, delete "a" and insert --said--.

In claim 19, column 26, line 28, delete "relaceable" and insert --replaceable--.

In claim 20, column 26, line 39, after "a" insert --first--. Line 40, delete "the" and insert --a first--.

In claim 21, column 26, line 48, after "wherein the" insert --removably__--.

In claim 22, column 26, line 57, delete "signal". After "said" insert --encrypted--.

In claim 26, column 27, line 25, replace "a" with --said--.

UNITED STATES PATENT AND TRADEMARK OFFICE
CERTIFICATE OF CORRECTION

PATENT NO. : 5,237,610
DATED : August 17, 1993
INVENTOR(S) : Keith Gammie et al.

It is certified that error appears in the above-indentified patent and that said Letters Patent is hereby corrected as shown below:

In claim 28, column 28, line 15, delete "a" (first occurence).

Signed and Sealed this

Eleventh Day of August 1998

*Attest:*

BRUCE LEHMAN

*Attesting Officer*          *Commissioner of Patents and Trademarks*